US012713353B2

(12) United States Patent
Shafin et al.

(10) Patent No.: US 12,713,353 B2
(45) Date of Patent: Aug. 18, 2026

(54) RESTRICTED TWT SERVICE PERIOD EXTENSION MECHANISM

(71) Applicant: Samsung Electronics Co., Ltd., Suwon-si (KR)

(72) Inventors: Rubayet Shafin, Allen, TX (US); Boon Loong Ng, Plano, TX (US); Vishnu Vardhan Ratnam, Plano, TX (US); Junsu Choi, Siheung-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 467 days.

(21) Appl. No.: 18/157,763

(22) Filed: Jan. 20, 2023

(65) Prior Publication Data

US 2023/0239798 A1 Jul. 27, 2023

Related U.S. Application Data

(60) Provisional application No. 63/333,437, filed on Apr. 21, 2022, provisional application No. 63/309,347, (Continued)

(51) Int. Cl.

*H04W 52/02* (2009.01)
*H04W 28/02* (2009.01)
*H04W 84/12* (2009.01)

(52) U.S. Cl.

CPC ... *H04W 52/0248* (2013.01); *H04W 28/0278* (2013.01); *H04W 84/12* (2013.01)

(58) Field of Classification Search

CPC ......... H04W 52/0248; H04W 28/0278; H04W 84/12

See application file for complete search history.

(56) References Cited

U.S. PATENT DOCUMENTS 11,153,824 B1 10/2021 Jia et al.
2017/0195954 A1 7/2017 Ghosh
(Continued)

FOREIGN PATENT DOCUMENTS

WO WO-2022251117 A1 * 12/2022 ........ H04W 52/0209

OTHER PUBLICATIONS

LAN/MAN Standards Committee of the IEEE Computer Society, IEEE P802.11be™/D1.31, "Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely high throughput (EHT)", Dec. 2021, 765 pages.

(Continued)

*Primary Examiner* — Kevin T Bates
*Assistant Examiner* — Jaeyoung Kwak

(57) ABSTRACT

Methods and apparatuses for facilitating extension of the duration of a target wake time (TWT) service period (SP) for TWT operation of wireless devices in a wireless local area network (WLAN). A station (STA) device comprises a transceiver and a processor operably coupled to the transceiver. The transceiver is configured to establish a TWT schedule with an access point (AP), the TWT schedule having a TWT SP with a duration that ends at a nominal SP end time, and to remain in an awake state for the duration of the TWT SP. The processor is configured to determine to extend the duration of the TWT SP to a new SP end time that is after the nominal SP end time.

20 Claims, 24 Drawing Sheets

Related U.S. Application Data filed on Feb. 11, 2022, provisional application No. 63/301,860, filed on Jan. 21, 2022.

(56) References Cited

U.S. PATENT DOCUMENTS

| | | | | |
|---|---|---|---|---|
| 2017/0311258 | A1* | 10/2017 | Asterjadhi | H04W 28/0221 |
| 2019/0045438 | A1* | 2/2019 | Cariou | H04W 52/0229 |
| 2019/0246354 | A1 | 8/2019 | Huang et al. | |
| 2021/0084588 | A1 | 3/2021 | Kloper | |
| 2023/0047705 | A1* | 2/2023 | Xin | H04W 52/0216 |
| 2024/0040646 | A1* | 2/2024 | Ma | H04W 52/0235 |
| 2024/0284250 | A1* | 8/2024 | Baek | H04W 28/06 |

OTHER PUBLICATIONS

Extended European Search Report issued Mar. 10, 2025 regarding Application No. 23743558.1, 6 pages.

IEEE P802.11be-D2.1, "Part 11: Wireless LAN Medium Access Control (MAC) and Physical Layer (PHY) Specifications, Amendment 8: Enhancements for extremely high throughput (EHT)", Jul. 2022, 885 pages.

International Search Report and Written Opinion issued Apr. 12, 2023 regarding International Application No. PCT/KR2023/001081, 9 pages.

Baek et al., "TGbe D0.3 Comment Resolutions for Restricted TWT SP", IEEE 802.11-21/0672r2, Jul. 2021, 4 pages.

Office Action issued Mar. 12, 2026, in connection with European Patent Application No. 23743558.1, 5 pages.

* cited by examiner

Broadcast TWT ID
Response Requested
TWT SP Extension Duration
Reserved
Bits
5
1
8
2

Broadcast TWT ID
Response Requested
TWT SP Extension End Time
Reserved
Bits
5
1
16
2

Broadcast TWT IE
Beacon
Broadcast TWT_1
TWT SP for STA1
BlockAck
rSEI frame
DL PPDU
...
Beacon
AP
Listen Interval
t1
TWT SP
BlockAck
rTWT member STA 1
Doze
t4
t6
t5
t7
t8
T2
T1
UL PPDU
EHT non-rTWT supporting STA 2
t2
t3

Bits

Broadcast TWT ID 5

Command 3

Response Requested 1

TWT SP Extension Duration 8

Link ID Bitmap Present 1

All SP 1

Reserved 7

Link ID Bitmap 0 or 16

RESTRICTED TWT SERVICE PERIOD EXTENSION MECHANISM

CROSS-REFERENCE TO RELATED APPLICATION AND CLAIM OF PRIORITY

This application claims priority under 35 U.S.C. § 119(e) to U.S. Provisional Patent Application No. 63/301,860 filed on Jan. 21, 2022, U.S. Provisional Patent Application No. 63/309,347 filed on Feb. 11, 2022, and U.S. Provisional Patent Application No. 63/333,437 filed on Apr. 21, 2022, which are hereby incorporated by reference in their entirety.

TECHNICAL FIELD

This disclosure relates generally to transmission efficiency in wireless communications systems that include multi-link devices. Embodiments of this disclosure relate to methods and apparatuses that enable extension of target wake time service periods for communication between wireless devices in a wireless local area network.

BACKGROUND

Wireless local area network (WLAN) technology allows devices to access the internet in the 2.4 GHz, 5 GHz, 6 GHz, or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Target Wake Time (TWT) is one of the important features for power management in WI-FI networks, which was developed by IEEE 802.11ah and later adopted and modified into IEEE 802.11ax. TWT enables wake time negotiation between an AP and an associated station (STA) for improving power efficiency. With TWT operation, it suffices for a STA to only wake up at a pre-scheduled time negotiated with another STA or AP in the network. In IEEE 802.11ax standards, two types of TWT operation are possible—individual TWT operation and broadcast TWT operation. Individual TWT agreements can be established between two STAs or between a STA and an AP. On the other hand, with broadcast TWT operation, an AP can set up a shared TWT session for a group of STAs.

The negotiated parameters such as the wake interval, wake duration and initial wake time (offset) highly affect latency, throughput as well as power efficiency, which are directly related to QoS (quality of service) or customer experiences. Services with different traffic characteristics will have different TWT parameter configurations for better QoS. Additionally, the TWT configuration should adapt to network and service status variation.

Restricted TWT (rTWT) operation, which is based on broadcast TWT operation, is a feature introduced in IEEE 802.11be standards with a view to providing better support for latency sensitive applications. Restricted TWT offers a protected service period for its member STAs by sending Quiet elements to other STAs in the basic service set (BSS) which are not members of the restricted TWT schedule, where the Quiet interval corresponding to the Quiet element overlaps with the initial portion of the restricted TWT service period (SP). Hence, it gives more channel access opportunity for the restricted TWT member scheduled STAs, which supports latency-sensitive traffic flow. There are some key characteristics that make restricted TWT operation an important feature for supporting low-latency applications in next generation WLAN systems.

Next generation extremely high throughput (EHT) WI-FI systems, e.g., IEEE 802.11be, support multiple bands of operation, called links, over which an access point (AP) and a non-AP device can communicate with each other. Thus, both the AP and non-AP device may be capable of communicating on different bands/links, which is referred to as multi-link operation (MLO). The WI-FI devices that support MLO are referred to as multi-link devices (MLDs). With MLO, it is possible for a non-access point (non-AP) MLD to discover, authenticate, associate, and set up multiple links with an AP MLD. Channel access and frame exchange is possible on each link that is set up between the AP MLD and non-AP MLD.

SUMMARY

Embodiments of the present disclosure provide methods and apparatuses that facilitate extending the duration of a TWT SP for TWT operation of wireless devices in a WLAN.

In one embodiment, a wireless STA device is provided, comprising a transceiver and a processor operably coupled to the transceiver. The transceiver is configured to establish a TWT schedule with an AP, the TWT schedule having a TWT SP with a duration that ends at a nominal SP end time, and to remain in an awake state for the duration of the TWT SP. The processor is configured to determine to extend the duration of the TWT SP to a new SP end time that is after the nominal SP end time.

In another embodiment, a wireless AP device is provided, comprising a transceiver and a processor operably coupled to the transceiver. The transceiver is configured to establish a TWT schedule with an STA, the TWT schedule having a TWT SP with a duration that ends at a nominal SP end time, wherein the STA is configured to remain in an awake state for the duration of the TWT SP. The processor is configured to determine to extend the duration of the TWT SP to a new SP end time that is after the nominal SP end time.

In another embodiment, a method of wireless communication is provided, performed by a wireless STA device. The method includes the steps of establishing a TWT schedule with an AP, the TWT schedule having a TWT SP with a duration that ends at a nominal SP end time, remaining in an awake state for the duration of the TWT SP, and determining to extend the duration of the TWT SP to a new SP end time that is after the nominal SP end time.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 26B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that in some scenarios a TWT scheduled STA or TWT requesting STA may not be able to start transmission of traffic scheduled for the TWT at the scheduled TWT SP start time. As a result, the scheduled TWT SP start time and actual TWT SP start time can be different. Furthermore, in terms of power saving behavior, the TWT scheduled or requesting STA is only required to stay awake until the scheduled TWT SP end time, which may not provide enough time to complete transmission of scheduled traffic in the case of a late SP start. The current specification does not provide any kind of remedy to compensate for the missed portion of the TWT SP.

Accordingly, embodiments of the present disclosure provide apparatuses and methods that enable a TWT SP to be extended beyond the nominal end time of the SP. Some embodiments enable the TWT scheduled STA or TWT requesting STA to initiate extension of its TWT SP and to inform the associated TWT scheduling AP of the extended SP (e.g., for uplink (UL) traffic), while other embodiments enable the TWT scheduling AP to instruct the associated TWT scheduled STA or TWT requesting STA to extend its SP (e.g., for downlink (DL) traffic). For simplicity, a TWT scheduled STA or TWT requesting STA may be referred to simply as a STA herein below, and likewise a TWT scheduling AP may be referred to simply as an AP herein below.

Additionally, it is understood that embodiments of the present disclosure may be applied to systems using restricted TWT schedules as well as to systems using individual TWT agreements and broadcast TWT schedules (e.g., non-restricted TWT schedules or agreements). For simplicity, however, various examples may be illustrated using only one of these types of TWT schedules or agreements.

Figure 1:
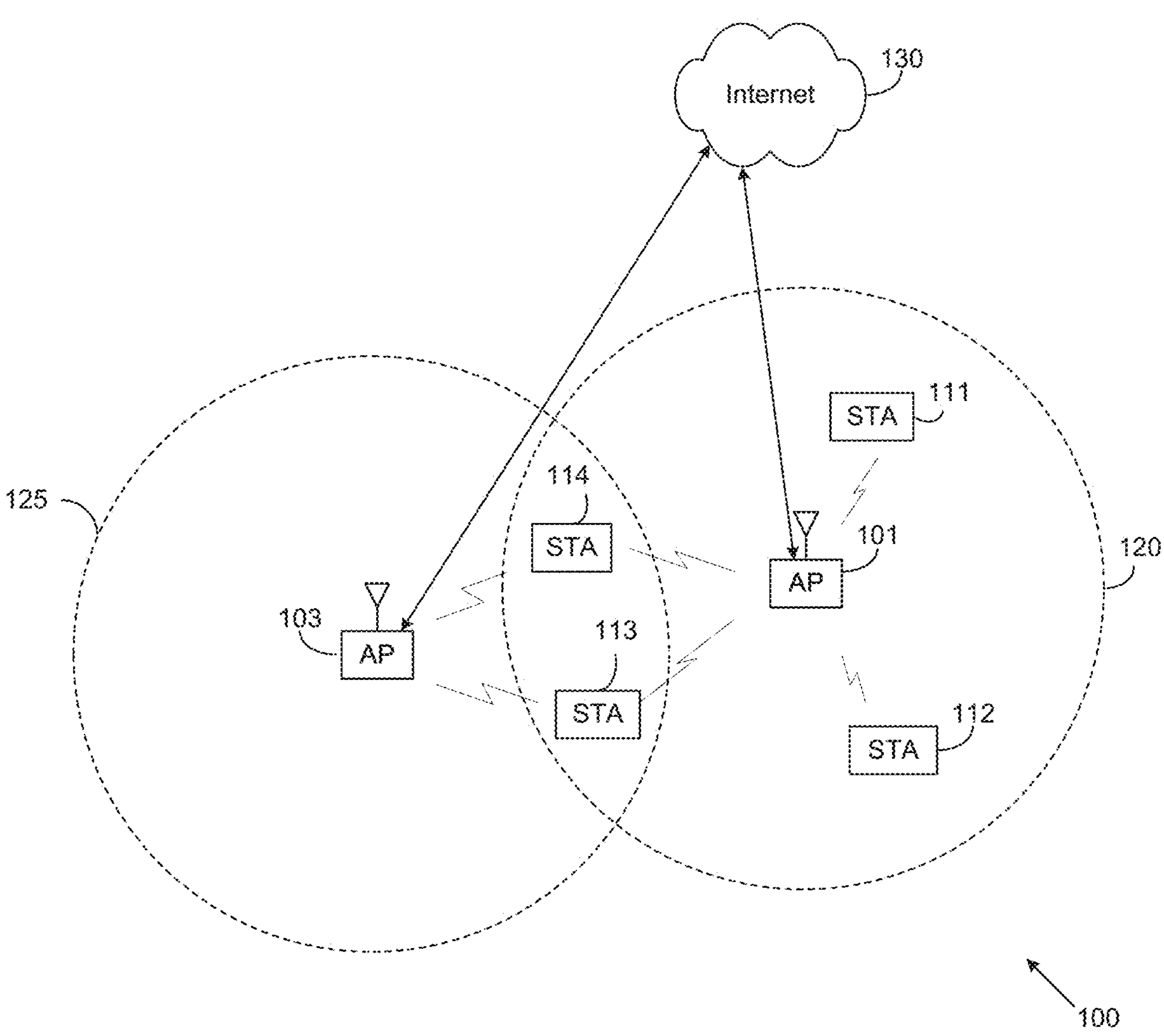
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using Wi-Fi or other WLAN communication techniques.

Depending on the network type, other well-known terms may be used instead of “access point” or “AP,” such as “router” or “gateway.” For the sake of convenience, the term “AP” is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of “station” or “STA,” such as “mobile station,” “subscriber station,” “remote terminal,” “user equipment,” “wireless terminal,” or “user device.” For the sake of convenience, the terms “station” and “STA” are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, each of the APs 101 and 103 and each of the STAs 111-114 may be an MLD. In such embodiments, APs 101 and 103 may be AP MLDs, and STAs 111-114 may be non-AP MLDs. Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for facilitating extending the duration of a TWT SP for TWT operation of wireless devices in a WLAN. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
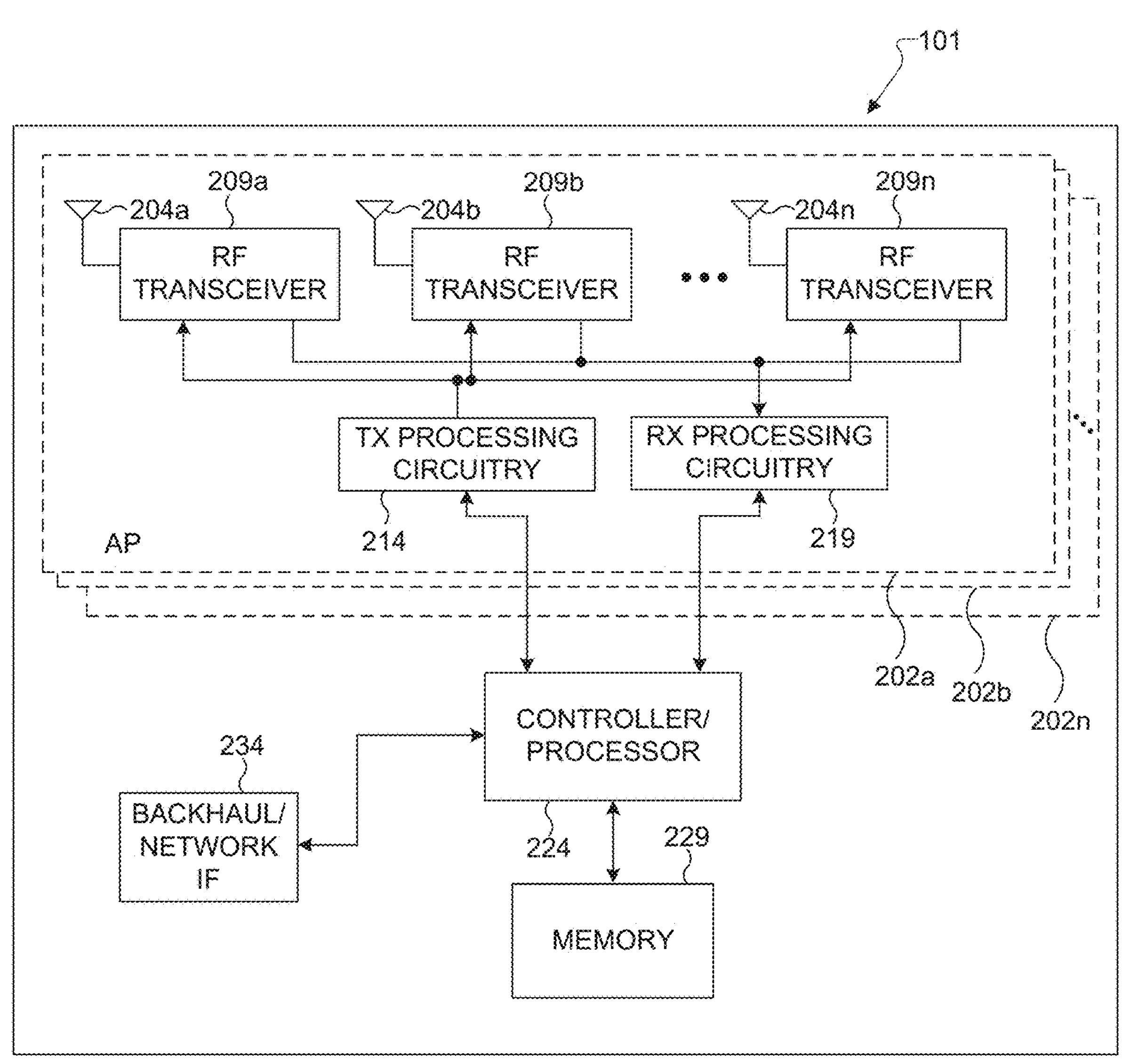
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202*a*-202*n* (which may be referred to, for example, as AP1-APn). Each of the affiliated APs 202*a*-202*n* includes multiple antennas 204*a*-204*n*, multiple RF transceivers 209*a*-209*n*, transmit (TX) processing circuitry 214, and receive (RX) processing circuitry 219. The AP MLD 101 also includes a controller/processor 224, a memory 229, and a backhaul or network interface 234.

The illustrated components of each affiliated AP 202*a*-202*n* may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202*a*-202*n*.

For each affiliated AP 202*a*-202*n*, the RF transceivers 209*a*-209*n* receive, from the antennas 204*a*-204*n*, incoming RF signals, such as signals transmitted by STAs in the network 100. In some embodiments, each affiliated AP 202*a*-202*n* operates at a different bandwidth, e.g., 2.4 GHz, 5 GHz, or 6 GHz, and accordingly the incoming RF signals received by each affiliated AP may be at a different frequency of RF. The RF transceivers 209*a*-209*n* down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202*a*-202*n*, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209*a*-209*n* receive the outgoing processed baseband or IF signals from the TX processing circuitry 214 and up-convert the baseband or IF signals to RF signals that are transmitted via the antennas 204*a*-204*n*. In embodiments wherein each affiliated AP 202*a*-202*n* operates at a different bandwidth, e.g., 2.4 GHz, 5 GHz, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209*a*-209*n*, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204*a*-204*n* are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP MLD 101 by the controller/processor 224 including facilitating extending the duration of a TWT SP for TWT operation of wireless devices in a WLAN. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connection(s). For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP MLD 101 may include circuitry and/or programming for facilitating extending the duration of a TWT SP for TWT operation of wireless devices in a WLAN. Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202*a*-202*n* is shown as including a single instance of TX processing circuitry 214 and a single instance of RX processing circuitry 219, the AP MLD 101 could include multiple instances of each (such as one per RF transceiver) in one or more of the affiliated APs 202*a*-202*n*. Alternatively, only one antenna and RF transceiver path may be included in one or more of the affiliated APs 202*a*-202*n*, such as in legacy APs. Also, various components in FIG. 2A could be combined, further subdivided, or omitted and additional components could be added according to particular needs.

Figure 2B:
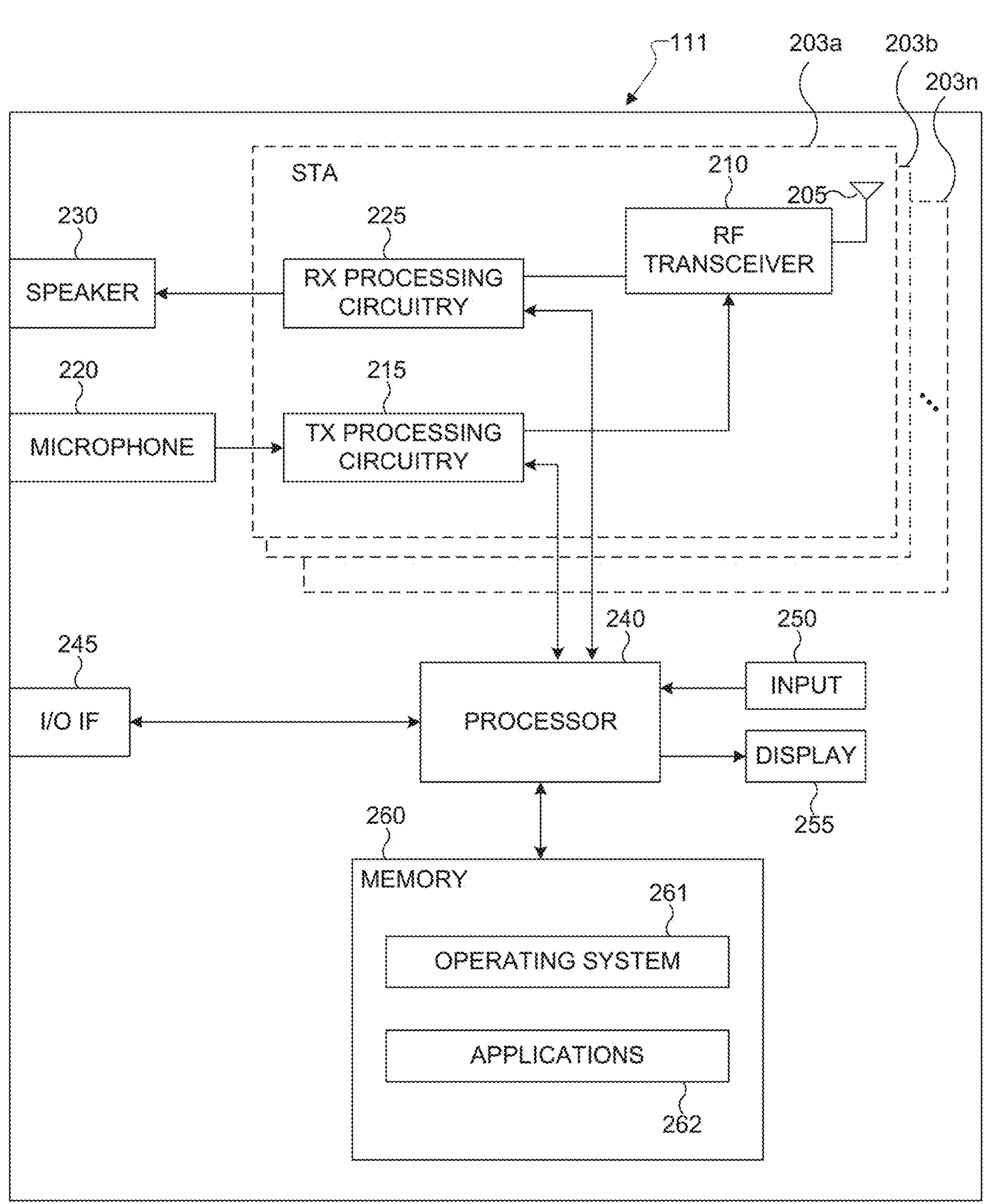
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of an STA.

The non-AP MLD 111 is affiliated with multiple STAs 203*a*-203*n* (which may be referred to, for example, as STA1-STAn). Each of the affiliated STAs 203*a*-203*n* includes antenna(s) 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203*a*-203*n* may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203*a*-203*n*.

For each affiliated STA 203*a*-203*n*, the RF transceiver 210 receives, from the antenna(s) 205, an incoming RF signal transmitted by an AP of the network 100. In some embodiments, each affiliated STA 203*a*-203*n* operates at a different bandwidth, e.g., 2.4 GHz, 5 GHz, or 6 GHz, and accordingly the incoming RF signals received by each affiliated STA may be at a different frequency of RF. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203*a*-203*n*, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205. In embodiments wherein each affiliated STA 203*a*-203*n* operates at a different bandwidth, e.g., 2.4 GHz, 5 GHz, or 6 GHz, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to facilitate extending the duration of a TWT SP for TWT operation of wireless devices in a WLAN. In some embodiments, the controller/processor 240 includes at least one microprocessor or microcontroller.

The controller/processor 240 is also capable of executing other processes and programs resident in the memory 260, such as operations for facilitating extending the duration of a TWT SP for TWT operation of wireless devices in a WLAN. The controller/processor 240 can move data into or out of the memory 260 as required by an executing process. In some embodiments, the controller/processor 240 is configured to execute a plurality of applications 262, such as applications for facilitating extending the duration of a TWT SP for TWT operation of wireless devices in a WLAN. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203*a*-203*n* may include any number of antenna(s) 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). Also, while FIG. 2B illustrates the non-AP MLD 111 configured as a mobile telephone or smartphone, non-AP MLDs can be configured to operate as other types of mobile or stationary devices.

Figure 3:
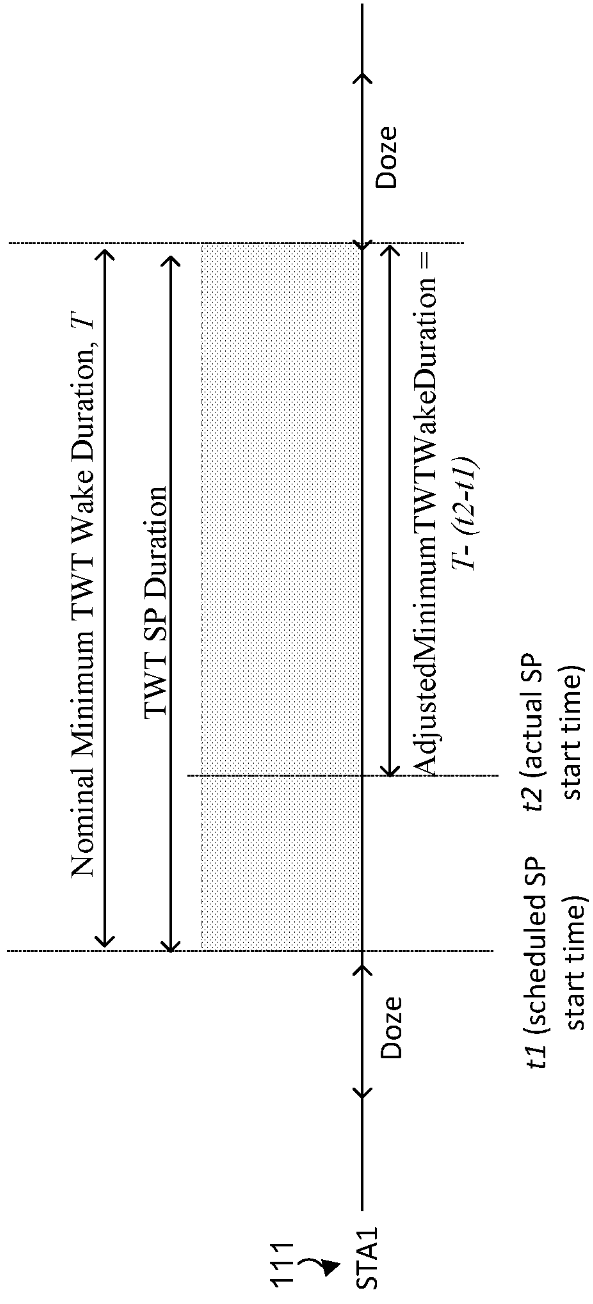
FIG. 3 illustrates an example of different timing components of a TWT SP that is delayed according to embodiments of the present disclosure.

FIG. 3 illustrates an example of different timing components of a TWT SP that is delayed according to embodiments of the present disclosure. In the example of FIG. 3, STA1 (which may be a STA 111) is a TWT scheduled STA and AP1 (not illustrated) is its associated TWT scheduling AP. STA1 establishes a broadcast TWT schedule with AP1. In the Broadcast TWT Parameter Set field, t1 is the value of the target wake time indicated in the Target Wake Time field in the Broadcast TWT Parameter Set field of the TWT element. Hence, t1 is the time when STA1 should ideally be able to start frame exchanges with AP1. Starting from t1, the time duration the STA is required to remain awake is the value of the nominal wake time (T) indicated in the Nominal Minimum TWT Wake Duration field in the Broadcast TW Parameter Set field. For various reasons, it may not be possible for STA1 to start frame exchanges with AP1 at the nominal SP start time, t1. The actual SP start time can therefore be much later. In this example, the actual SP start time is indicated as time t2. With the delayed actual SP start time, the required minimum wake duration for STA1 is also adjusted and is indicated as the AdjustedMinimumTWTWakeDuration=T−(t2−t1).

Figure 4:
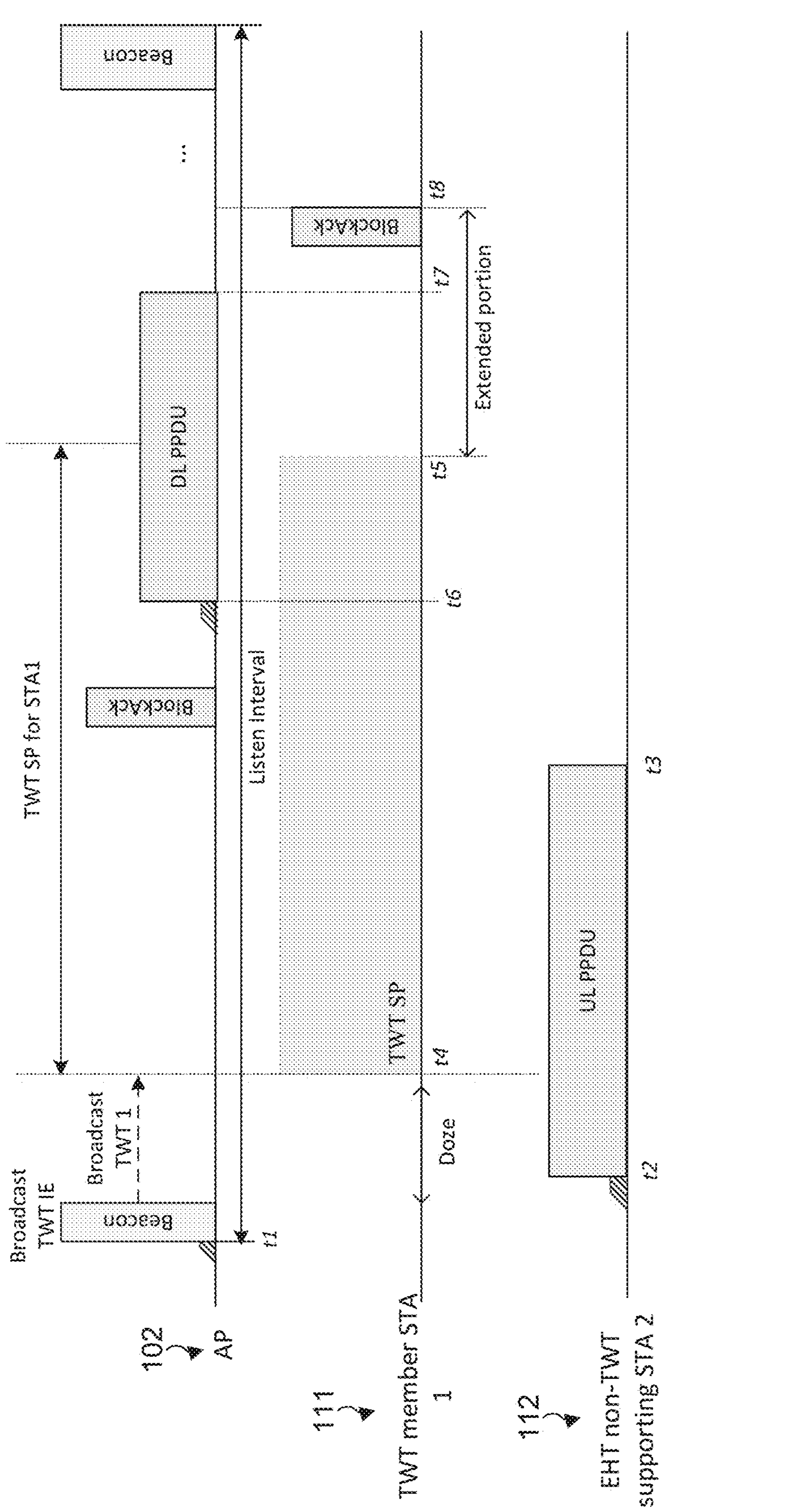
FIG. 4 illustrates an example scenario in which a TWT scheduling AP extends the TWT SP in order to complete the delivery of the DL PPDU for a TWT scheduled STA according to embodiments of the present disclosure.

FIG. 4 illustrates an example scenario in which a TWT scheduling AP extends the TWT SP in order to complete the delivery of the DL PPDU for a TWT scheduled STA according to embodiments of the present disclosure. In the example of FIG. 4, the AP (e.g., AP 102) is unable to begin TWT frame exchanges with the TWT member STA, STA1 (e.g., STA 111), at the nominal TWT SP start time because a non-member STA, STA2 (e.g., STA 112), is occupying the channel at that time. Accordingly, the AP is unable to finish transmission of a DL PPDU to STA1 before the nominal end time of the TWT SP.

For restricted TWT operation, an rTWT scheduled STA is expected to have latency-sensitive frame exchanges with its associated rTWT scheduling AP. If the rTWT scheduling AP in DL is not finished transmitting latency-sensitive traffic for an rTWT scheduled STA within the restricted TWT SP duration, then the rTWT scheduled STA's performance will be affected. In order to complete the delivery of the downlink traffic for the rTWT scheduled STA, the rTWT scheduling AP may continue transmitting DL PPDU beyond the end time of the SP.

However, according to the current specification the rTWT scheduled STA is not required to stay awake beyond the AdjustedMinimumTWTWakeDuration. That is, the rTWT scheduling AP cannot continue transmitting the DL PPDU relying on the fact that the rTWT scheduled STA will be in the Awake state beyond the rTWT SP's nominal end time. Hence, the present disclosure provides mechanisms for the scheduling AP to inform the STA about how much extra time the STA needs to stay awake beyond the restricted TWT schedule's nominal end time (exceeding the duration indicated by the AdjustedMinimumTWTWakeDuration) so that the rTWT scheduling AP can finish transmitting the latency-sensitive traffic for the corresponding rTWT scheduled STA. It is understood that these mechanisms may apply for both restricted TWT and non-restricted TWT operation.

Figure 5:
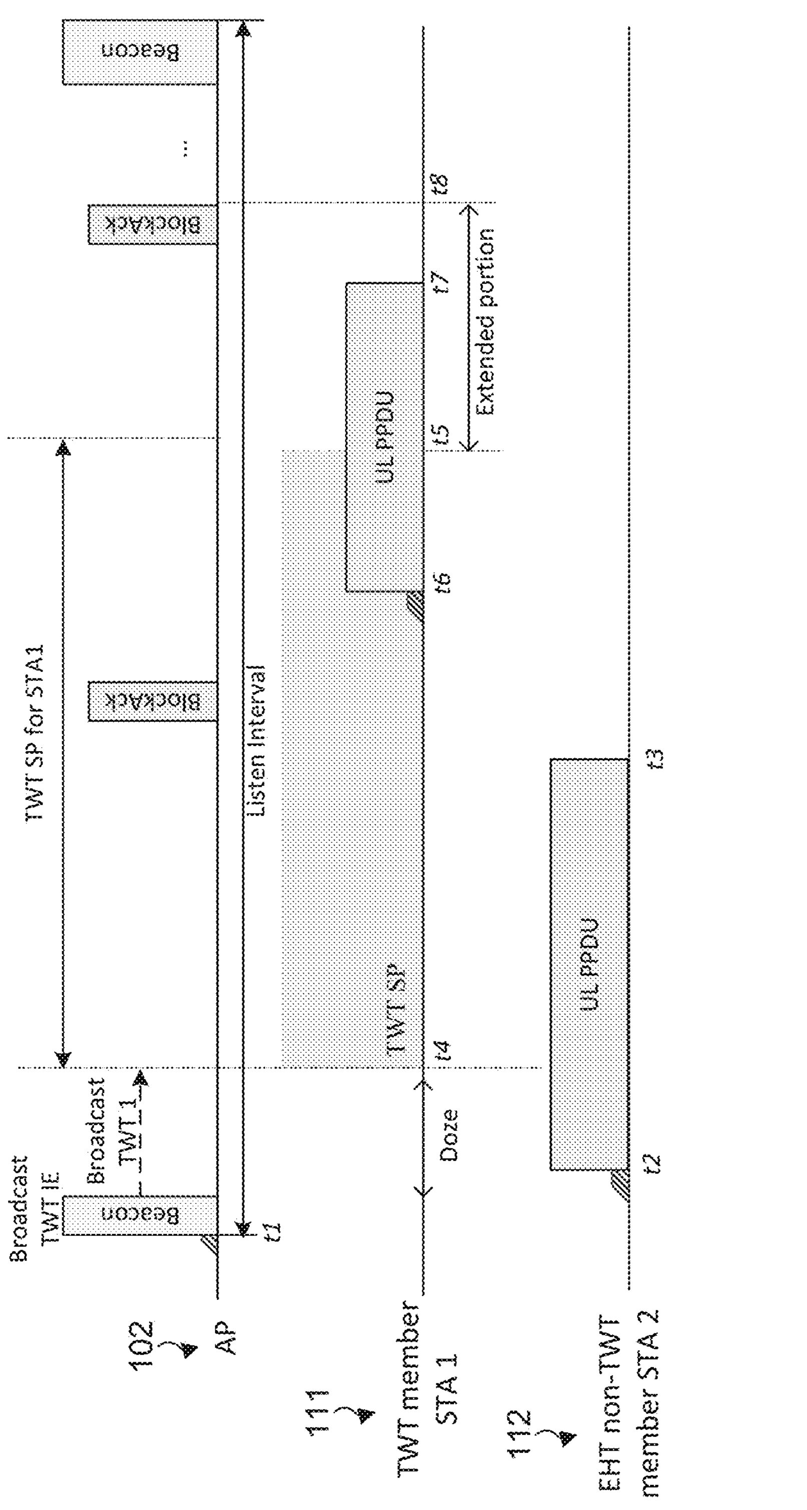
FIG. 5 illustrates an example scenario in which the TWT scheduled STA extends the TWT SP in order to complete the transmission of UL PPDU to its associated TWT scheduling AP according to embodiments of the present disclosure.

FIG. 5 illustrates an example scenario in which the TWT scheduled STA extends the TWT SP in order to complete the transmission of UL PPDU to its associated TWT scheduling AP according to embodiments of the present disclosure. Similar to the example of FIG. 4, this is particularly relevant for restricted TWT operation. For uplink communication, if, for some reason, an rTWT scheduled STA cannot finish its latency-sensitive UL PPDU transmission to its associated rTWT scheduling AP during the restricted TWT schedule, the STA can continue transmission of the UL PPDU beyond the restricted TWT schedule's nominal end time. However, this would violate the current specification recommendation, according to which an rTWT scheduled STA should not transmit any frame outside of the TWT SP. However, the current specification does not provide a mechanism that allows the rTWT scheduled STA to make a request to the rTWT scheduling AP to extend the restricted TWT schedule beyond the nominal SP end time. Hence, for uplink communication in addition to downlink communication, embodiments of the present disclosure provide mechanisms to enable extension of a restricted TWT SP beyond its nominal end time.

Other use cases for an rTWT SP extension mechanism are also considered. For example, such a mechanism may be used for the scenario in which multiple restricted TWT schedules are established on multiple links between an AP MLD and a non-AP MLD, those links are also included in the enhanced multi-link single radio (EMLSR) links, and the TWT SP on one link (e.g., the first link) overlaps partially, in time, with a TWT SP on another link (e.g., the second link) such that the TWT SP on the second link starts earlier than the TWT SP on first link but the TWT SP on the first link ends later than the TWT SP on the second link. This is illustrated in FIG. 6 below.

Figure 6:
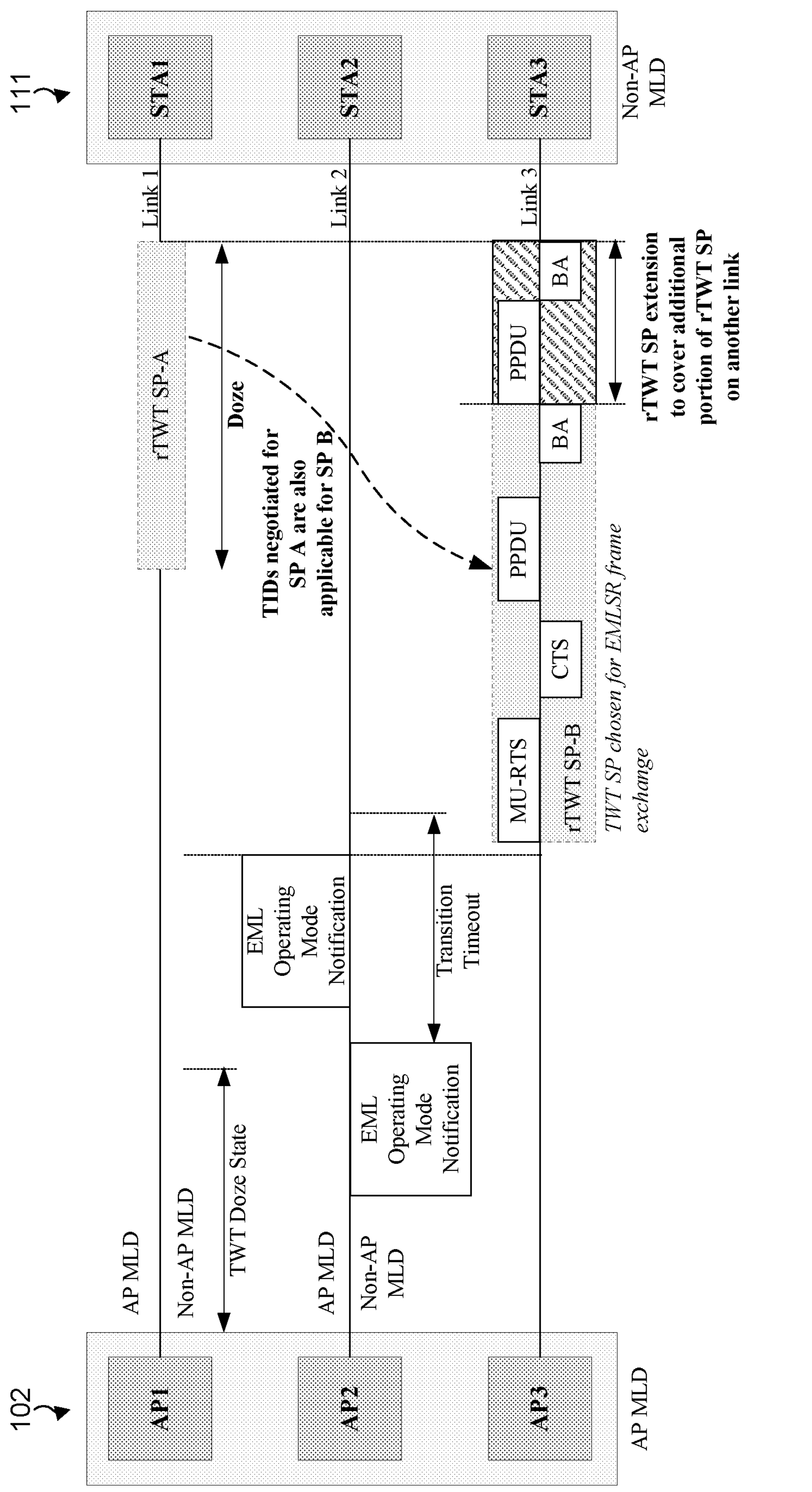
FIG. 6 illustrates an example of restricted TWT SP extension for EMLSR operation with multiple restricted TWT schedules across multiple links between the AP MLD and a non-AP MLD according to embodiments of the present disclosure.

FIG. 6 illustrates an example of restricted TWT SP extension for EMLSR operation with multiple restricted TWT schedules across multiple links between the AP MLD and a non-AP MLD according to embodiments of the present disclosure. Upon the non-AP MLD transitioning into EMLSR mode, the AP MLD can select the second link for EMLSR frame exchanges and the restricted TWT SP on the second link can be extended such that its end time is aligned with the end time of the restricted TWT SP on the first link. The frames corresponding to the traffic identifiers (TIDs), e.g., the first set of TIDs, negotiated for the restricted TWT SP on the first link can be transmitted during the restricted TWT SP on the second link along with the frames corresponding to the TIDs, e.g., the second set of TIDs, negotiated for the restricted TWT SP on the second link even if the first set of TIDs are not mapped to the second link through TID-to-Link mapping. The STA affiliated with the non-AP MLD and operating on the first link can be in doze state during the restricted TWT SP on the first link. Hence, a restricted TWT SP extension mechanism can be used for efficient EMLSR operation where multiple TWT schedules or agreements are established across multiple links between an AP MLD and a non-AP MLD.

According to other embodiments, an rTWT scheduling AP can continue downlink frame transmission to an rTWT scheduled STA even after the end of a restricted TWT SP corresponding to the restricted TWT schedule in which the rTWT scheduled STA has obtained membership. The downlink frame transmission time can exceed the duration indicated by AdjustedMinimumTWTWakeDuration. The AP may either implicitly or implicitly indicate to the STA that it should stay awake beyond this duration.

Figure 7:
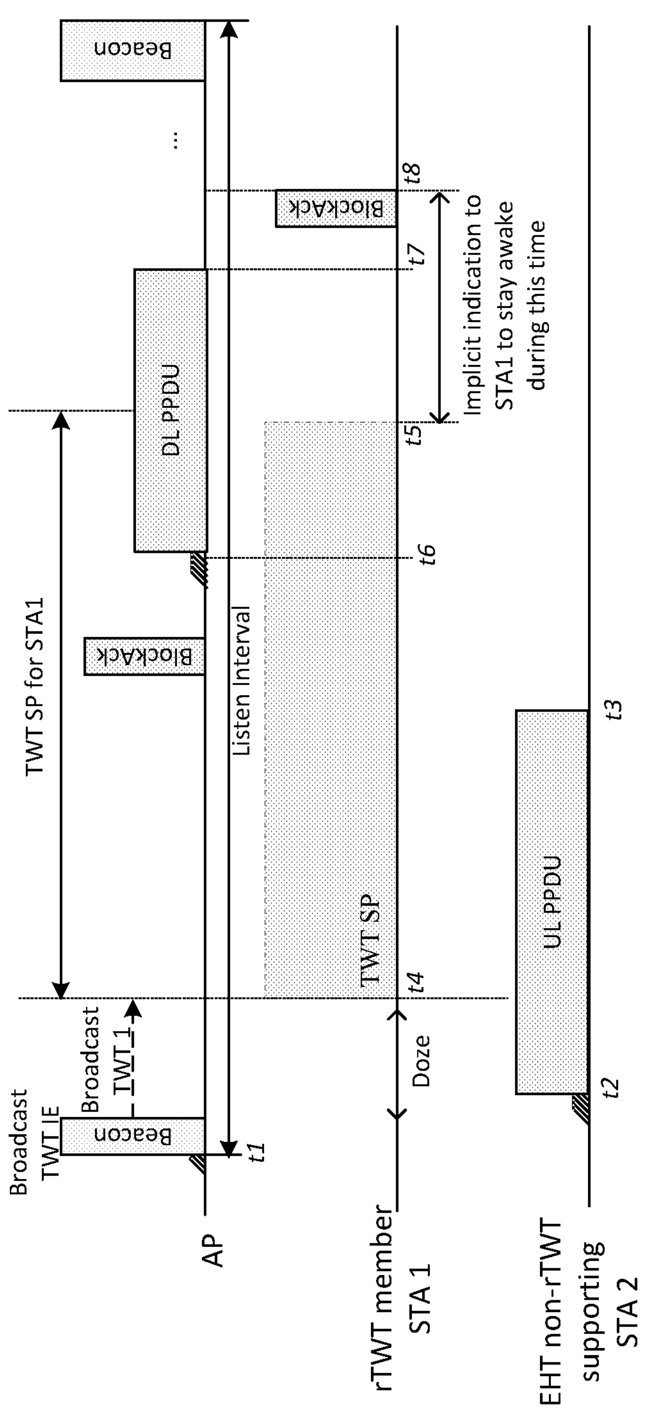
FIG. 7 illustrates an example of an implicit indication of restricted TWT SP extension by the rTWT scheduling AP according to embodiments of the present disclosure.

FIG. 7 illustrates an example of an implicit indication of restricted TWT SP extension by the rTWT scheduling AP according to embodiments of the present disclosure. According to this embodiment, the rTWT scheduled STA continues to stay awake beyond the nominal SP end time if the scheduling AP has already started transmitting a DL PPDU during the restricted TWT SP and the rTWT scheduled STA did not receive any indication that marks the end of the DL PPDU. At the end of the DL PPDU transmission the STA can go to doze. An incomplete DL PPDU frame transmission in this example functions as an implicit indication to the rTWT scheduled STA to remain awake even after the rTWT SP's nominal end time until that frame transmission is complete. According to another embodiment, if the DL PPDU frame requires an acknowledgement response frame (e.g., a BlockAck), then the rTWT scheduled STA stays awake until it transmits the acknowledge frame for the corresponding DL PPDU frame.

In the example of FIG. 7, STA1 and STA2 are two STAs associated with the AP. It is understood in the disclosure below that references to the AP are references to an AP such as AP 102, and references to a STA are references to one of the STAs that are associated with AP 102, such as STAs 111-114 (e.g., STA1 and STA2 may be STA 111 and STA 112, respectively). The AP transmits a Beacon frame containing a TWT element with a Restricted TWT Parameter Set field corresponding to a restricted TWT schedule. STA1 is an rTWT scheduled STA that has established the restricted TWT schedule with the associated rTWT scheduling AP. The wake time value indicated in the Target Wake Time field in the Restricted TWT Parameter Set field corresponding to the restricted TWT schedule is set as t4, and based on the Nominal Minimum TWT Wake Duration field value, the nominal TWT SP end time is t5. STA2 is a STA that does not support restricted TWT operation. STA2 starts transmitting a UL PPDU at time t2 and continues the transmission until time t3, after the restricted TWT SP start time t4. Although the AP has downlink latency-sensitive BUs for STA1, due to frame exchanges with STA2, the AP cannot start transmitting a DL PPDU to STA1 until time t6. In order to complete the DL PPDU transmission, the AP needs to continue transmitting the frame to STA1 until time t7, exceeding the nominal SP end time t5. The DL frame transmitted by the AP also requires an acknowledgement response frame from STA1. STA1 notices at time t5 that DL frame transmission has not finished even though the nominal SP end time has been reached. Accordingly, STA1 does not go to doze state even though the nominal SP end time has been reached and stays awake until the AP completes the DL PPDU transmission and the STA sends the BlockAck frame at time t8, after which STA1 goes to doze state.

Figure 8:
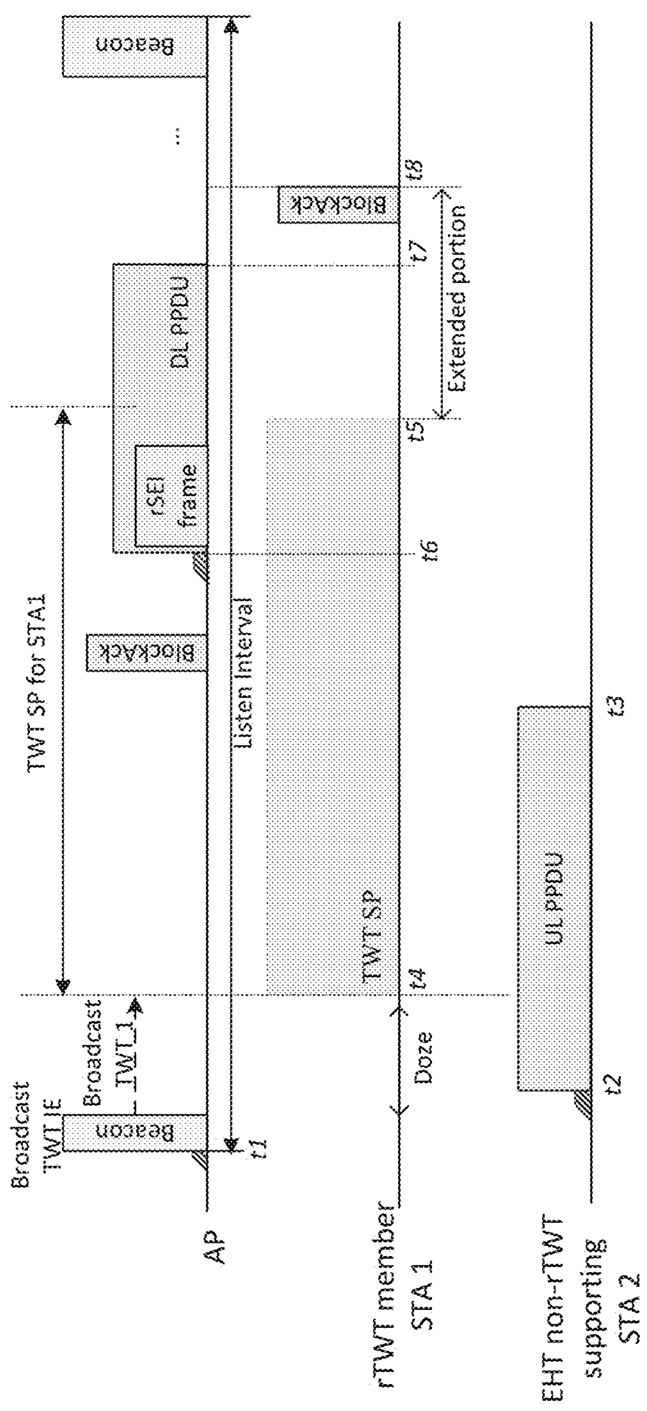
FIG. 8 illustrates an example of explicit indication of restricted TWT SP extension by the rTWT scheduling AP using a Restricted TWT SP Extension Information frame according to embodiments of the present disclosure.

FIG. 8 illustrates an example of explicit indication of restricted TWT SP extension by the rTWT scheduling AP using a Restricted TWT SP Extension Information frame according to embodiments of the present disclosure. According to this example, if an rTWT scheduling AP cannot finish DL PPDU transmission to an rTWT scheduled STA within the restricted TWT SP duration, then the rTWT scheduling AP can send some specific frame as an indication to the corresponding rTWT scheduled STA to stay awake an additional amount beyond the nominal restricted TWT SP end time so that the rTWT scheduling AP can finish transmitting the downlink latency-sensitive traffic to the rTWT scheduled STA. The downlink frame transmission time can exceed the duration indicated by AdjustedMinimumTWTWakeDuration. This is an explicit notification from the rTWT scheduling AP to the rTWT scheduled STA to remain awake beyond the nominal restricted TWT SP end time.

According to one embodiment, in order to make such an indication to the rTWT scheduled STA, the rTWT scheduling AP sends a frame named Restricted TWT SP Extension Information (rSEI) frame to the rTWT scheduled STA. Other frame names are also possible. The reception of this frame by the rTWT scheduled STA would be an indication that the rTWT scheduled STA needs to stay awake beyond the nominal SP end time so that the rTWT scheduling AP can finish transmitting latency sensitive traffic to the rTWT scheduled STA. The frame will contain all the necessary information about the restricted TWT SP extension time.

The example of FIG. 8 illustrates a scenario similar to that of FIG. 7. In the example of FIG. 8, after sending the BlockAck to the non-rTWT supporting STA2, the AP wins the channel to start transmitting the latency sensitive packets to the rTWT scheduled STA. At the beginning of frame transmission, the AP estimates how much time it will take to complete the downlink PPDU transmission to the rTWT scheduled STA and indicates that to the rTWT scheduled STA by sending a Restricted TWT SP Extension Information frame to the rTWT scheduled STA, STA1, at time t6. The Restricted TWT SP Extension Information frame indicates the additional time duration for which the rTWT scheduled STA needs to stay awake so that the rTWT scheduling AP can complete the downlink PPDU transmission. The Restricted TWT SP Extension Information frame is encapsulated in the DL PPDU transmission. This transmission continues until time t7, which exceeds the nominal restricted TWT SP end time, t5. Accordingly, the rTWT scheduled STA remains awake until the DL PPDU transmission is complete and goes to doze state at time t8 upon sending the BlockAck corresponding to the DL PPDU.

Table 1 below provides an example format of the Restricted TWT SP Extension Information frame. The definition of the Category field may be the same as that defined in the current specification and the value would be that for Unprotected S1G field.

TABLE 1

| Order | Information |
|---|---|
| 1 | Category |
| 2 | Unprotected S1G Action |
| 3 | Restricted TWT SP Extension Information |

Proposed new values of the Unprotected S1G Action field that includes Restricted TWT SP Extension Information frame value are shown in Table 2. The value assigned for Restricted TWT SP Extension Information frame is 12 in this example. Any other value from the Reserved values for the Restricted TWT SP Extension Information frame is also possible.

TABLE 2

| Value | Meaning | Time Priority |
|---|---|---|
| 0 | AID Switch Request | No |
| 1 | AID Switch Response | No |
| 2 | Sync Control | No |
| 3 | STA Information Announcement | No |
| 4 | EDCA Parameter Set | No |
| 5 | EL Operation | No |
| 6 | TWT Setup | No |
| 7 | TWT Teardown | No |
| 8 | Sectorized Group ID List | No |
| 9 | Sector ID Feedback | No |
| 10 | Reserved | |
| 11 | TWT Information | No |
| 12 | Restricted TWT SP Extension Information | No |
| 123-255 | Reserved | |

Referring to Table 1, instead of using the Restricted TWT SP Extension Information frame as an Unprotected S1G Action field, according to some embodiments, an A-Control subfield can also be used for this purpose. A possible set of Control ID subfield values including the Restricted TWT SP Extension Information field according to one such embodiment is shown in Table 3. Value 10 is used for the Restricted TWT SP Extension Information (RTSEI) field in this example. Other values between 10 and 14 are also possible.

TABLE 3

| Control ID value | Meaning | Length of Control Information subfield (bits) | Content of the Control Information subfield |
|---|---|---|---|
| 0 | Triggered response scheduling (TRS) | 26 | See 9.2.4.6a.1 (TRS Control) |
| 1 | Operating mode (OM) | 12 | See 9.2.4.6a.2 (OM Control) |
| 2 | HE link adaptation (HLA) | 26 | See 9.2.4.6a.3 (HLA Control) |
| 3 | Buffer status report (BSR) | 26 | See 9.2.4.6a.4 (BSR Control) |
| 4 | UL power headroom (UPH) | 8 | See 9.2.4.6a.5 (UPH Control) |
| 5 | Bandwidth query report (BQR) | 10 | See 9.2.4.6a.6 (BQR Control) |
| 6 | Command and status (CAS) | 8 | See 9.2.4.6a.7 (CAS Control) |
| 7 | EHT operating mode (EHT OM) | 6 | See 9.2.4.7.8 (EHT OM Control) |
| 8 | Single response scheduling (SRS) | 10 | See 9.2.4.7.9 (SRS Control) |
| 9 | AP assistance request (AAR) | 20 | See 9.2.4.7.10 (AAR Control) |
| 10 | Restricted TWT SP Extension Information (RTSEI) | | |
| 11-14 ~~7-14~~ | Reserved | | |
| 15 | Ones need expansion surely (ONES) | 26 | Set to all 1 s |

Figures 9, 10, 11:
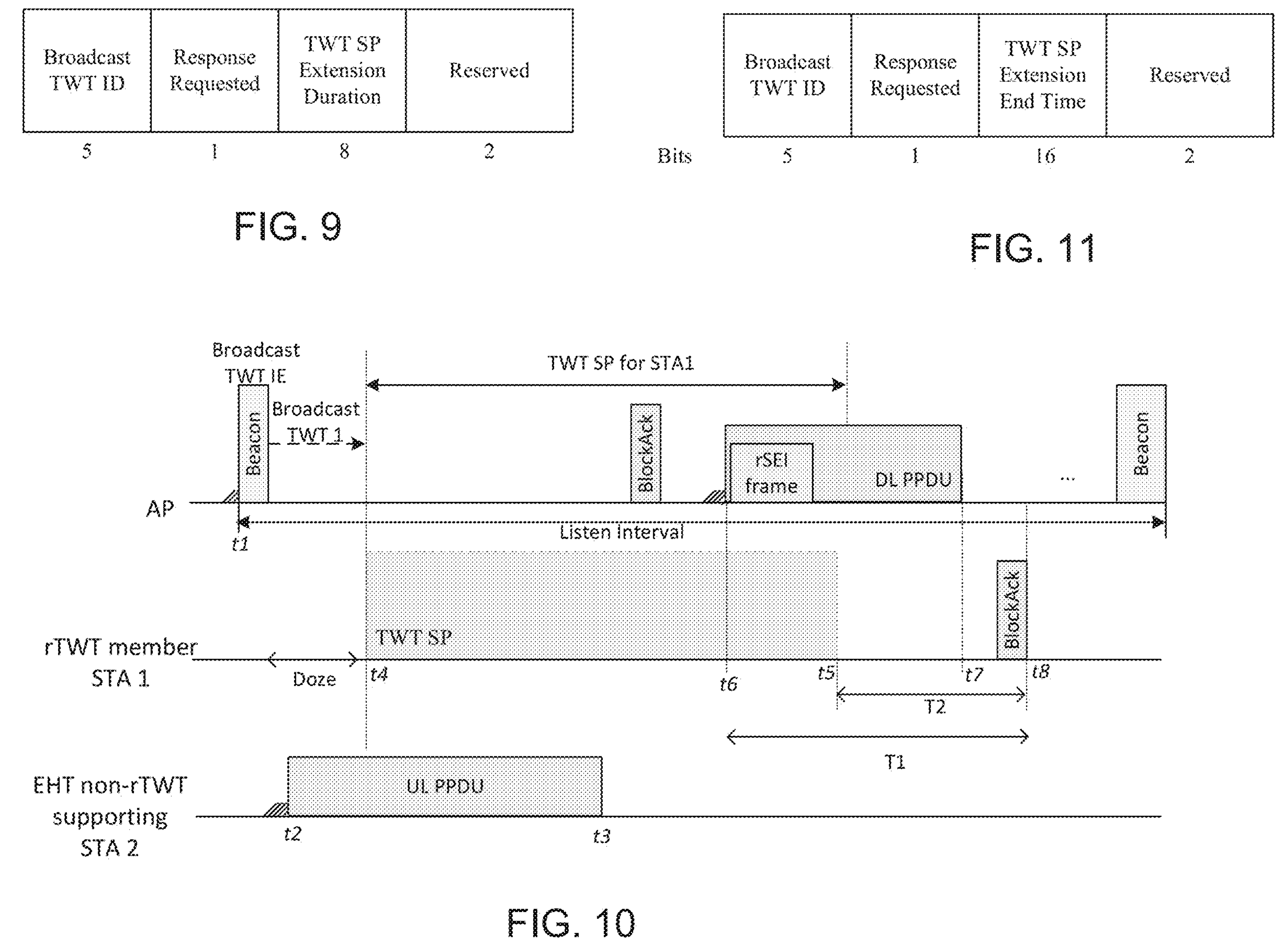
FIG. 9 illustrates an example format of the Restricted TWT SP Extension Information field in the Restricted TWT SP Extension Information frame according to embodiments of the present disclosure.
FIG. 10 illustrates an example of two possible definitions of values indicated in the TWT SP Extension Duration subfield in the Restricted TWT SP Extension Information field according to embodiments of the present disclosure.
FIG. 11 illustrates an example format of the Restricted TWT SP Extension Information field that includes a TWT SP Extension End Time subfield according to embodiments of the present disclosure.

FIG. 9 illustrates an example format of the Restricted TWT SP Extension Information field in the Restricted TWT SP Extension Information frame according to embodiments of the present disclosure. The Broadcast TWT ID in the Restricted TWT SP Extension Information field indicates the value indicated in the Broadcast TWT ID subfield in the Broadcast TWT Info subfield in the Restricted TWT Parameter Set field corresponding to the restricted TWT schedule for which the restricted TWT SP is being extended.

The Response Requested subfield in the Restricted TWT SP Extension Information field indicates whether or not a response frame is requested upon receipt of the Restricted TWT SP Extension Information frame. If the Response Requested subfield is set to 1, it indicates that a response is requested upon reception of the Restricted TWT SP Extension Information frame. Otherwise, no response is requested.

The TWT SP Extension Duration subfield in the Restricted TWT SP Extension Information field indicates the minimum duration of time (in units of the Wake Duration Unit subfield in the Control field of the Broadcast TWT element containing the Restricted TWT Parameter Set field corresponding to the restricted TWT schedule that is being extended) that the rTWT scheduled STA is expected to be awake in order to complete the frame exchanges with its associated rTWT scheduling AP even if the frame exchange duration exceeds the nominal restricted TWT SP end time.

FIG. 10 illustrates an example of two possible definitions of values indicated in the TWT SP Extension Duration subfield in the Restricted TWT SP Extension Information field according to embodiments of the present disclosure. According to one embodiment, the value indicated in the TWT SP Extension Duration subfield is indicated as T1 in FIG. 10, and is calculated with respect to the time instant when the frame exchange starts. According to another embodiment, the value indicated in the TWT SP Extension Duration subfield is indicated as T2 in FIG. 10, and is calculated with respect to the restricted TWT SP's nominal end time.

According to another embodiment, instead of using a time duration as indicated in the TWT SP Extension Duration subfield, the Restricted TWT SP Extension Information field can contain information on the time instant (TSF time) of the end time of the extended restricted TWT SP. According to this embodiment, the format of the Restricted TWT SP Extension Information field is shown in FIG. 11.

FIG. 11 illustrates an example format of the Restricted TWT SP Extension Information field that includes a TWT SP Extension End Time subfield according to embodiments of the present disclosure. The Broadcast TWT ID subfield and Response Requested subfield may be the same as those of FIG. 9. The TWT SP Extension End Time subfield contains an unsigned integer corresponding to a TSF time at which the extended restricted TWT SP will end.

In multi-link operation (MLO), according to one embodiment, if there is a restricted TWT schedule established over a link (say the first link) between an AP MLD and a non-AP MLD and if, for some reason, the schedule needs to be extended, then a Restricted TWT SP Extension Information frame can be sent over another enabled link (say the second link) between the same AP MLD and the same non-AP MLD to inform the non-AP MLD about the restricted TWT SP extension event on the first link. Accordingly, the STA affiliated with the non-AP MLD and operating on the first link would then be expected to remain awake for the indicated extended duration beyond its nominal SP end time.

Figures 12, 13:
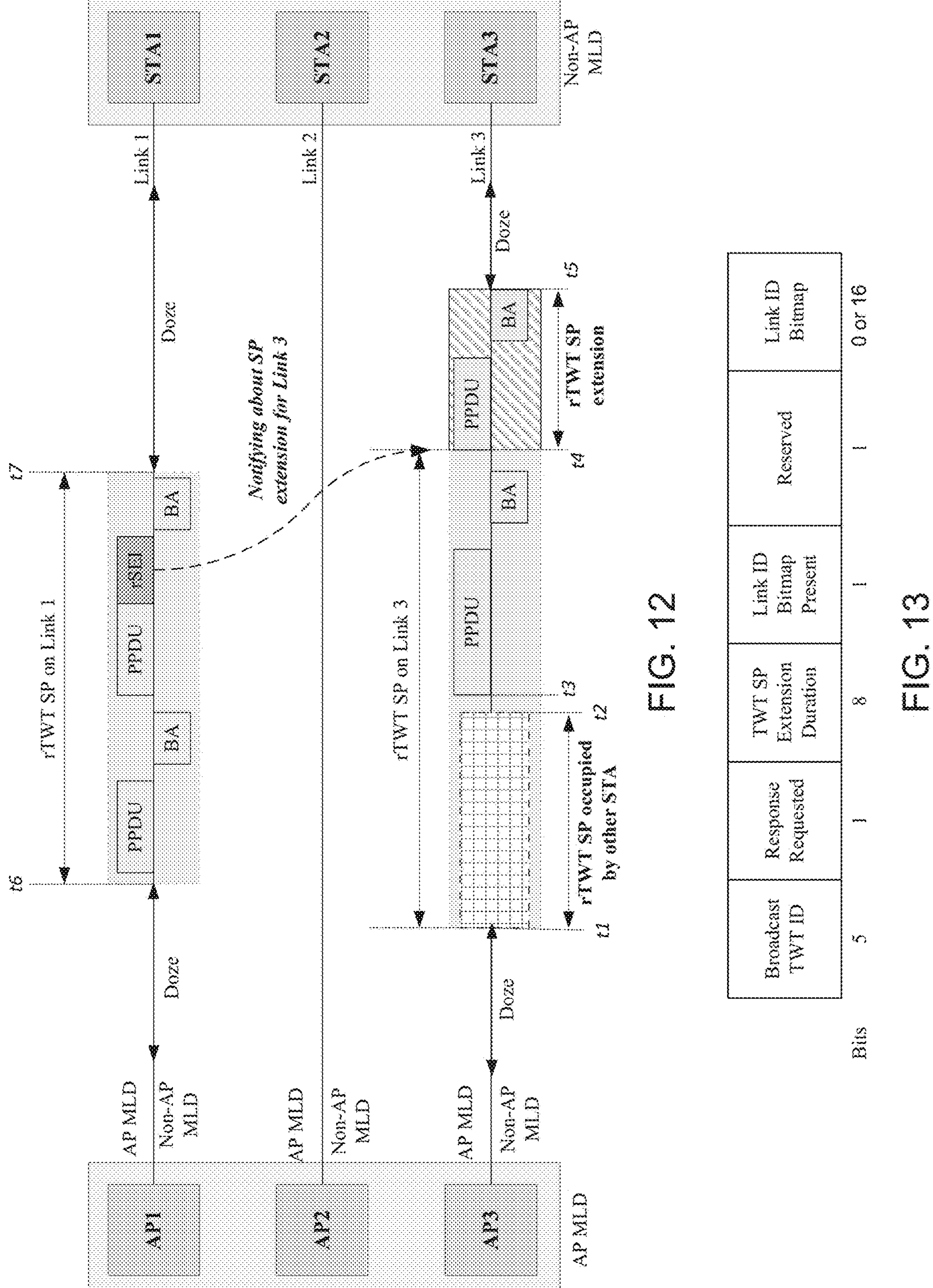
FIG. 12 illustrates an example of restricted TWT SP extension on one link by sending a Restricted TWT SP Extension Information frame over another link between the same AP MLD and the same non-AP MLD according to embodiments of the present disclosure.
FIG. 13 illustrates an example format of the Restricted TWT SP Extension Information field in the Restricted TWT SP Extension Information frame that accommodates multi-link operation according to embodiments of the present disclosure.

FIG. 12 illustrates an example of restricted TWT SP extension on one link by sending a Restricted TWT SP Extension Information frame over another link between the same AP MLD and the same non-AP MLD according to embodiments of the present disclosure. In the example of FIGS. 12, AP1, AP2, and AP3 are three APs affiliated with the AP MLD. STA1, STA2, and STA3 are there STAs affiliated with the non-AP MLD. Three links are set up between the AP MLD and the non-AP MLD—Link 1 between AP1 and STA1, Link 2 between AP2 and STA2, and Link 3 between AP3 and STA3. A restricted TWT schedule is established on Link 1, and the nominal start time and end time of the corresponding restricted TWT SP are denoted as t6 and t7, respectively. Another TWT schedule is established on Link 3, and the nominal start time and end time of the corresponding restricted TWT SP on Link 3 are denoted as t1 and t4, respectively. Although the nominal SP start time on Link 3 is t1, AP3 cannot transmit a DL PPDU on Link 3 until time t3 since the channel is occupied by another STA in the BSS from time t1 to time t2. Accordingly, the channel access time for STA3 is reduced.

AP3 thus determines that the restricted TWT SP on Link 3 needs to be extended until t5 so that latency-sensitive PPDU transmission for STA3 can be completed. Accordingly, a Restricted TWT SP Extension Information (rSEI) frame is sent from the AP MLD to the non-AP MLD on Link 1 to inform the non-AP MLD of the need to extend the rTWT SP on Link 3. According to one embodiment, yet another possible format of the Restricted TWT SP Extension Information field in the Restricted TWT SP Extension Information frame is provided to accommodate restricted TWT SP extension with multi-link operation.

FIG. 13 illustrates an example format of the Restricted TWT SP Extension Information field in the Restricted TWT SP Extension Information frame that accommodates multi-link operation according to embodiments of the present disclosure. According to one embodiment, the Extension Duration subfield (or, alternatively, an Extension End Time subfield) can indicate the additional time (with respect to the nominal TWT SP end time) that the AP or the STA estimates to take for the AP or the STA to complete the remaining frame exchanges between them. This can be determined based on how many packets are remaining in the queue for the destination device that were supposed to be delivered with the nominal RTWT SP duration.

The Link ID Bitmap subfield includes a bit corresponding to each enabled link between the AP MLD and the non-AP MLD, and indicates the link on which the rTWT SP is to be extended. If a bit in the bitmap is set to 1, then the rTWT SP on the corresponding link is to be extended. The Link ID Bitmap Present subfield may be used to indicate that the Link ID Bitmap subfield is included in the Restricted TWT SP Extension Information field.

Returning to the example of FIG. 12, the AP MLD lets the non-AP MLD know about the upcoming restricted TWT schedule extension event on Link 3 by sending the Restricted TWT SP Extension Information frame on Link 1 with the Link ID Bitmap Present subfield in the Restricted TWT SP Extension Information field set to 1 and the Link ID Bitmap subfield in the Restricted TWT SP Extension Information field indicating Link 3. Upon reception of the Restricted TWT SP Extension Information frame by the non-AP MLD on Link 1, STA3 would then stay awake until time t5 as indicated by the TWT SP Extension Duration subfield in the Restricted TWT SP Extension Information field.

According to one embodiment, whether a restricted TWT SP extension indicated through the Restricted TWT SP Extension Information frame is applicable only for one restricted TWT SP or applicable for all subsequent restricted TWT SPs can be indicated in the corresponding Restricted TWT SP Extension Information frame.

Figures 14, 15:
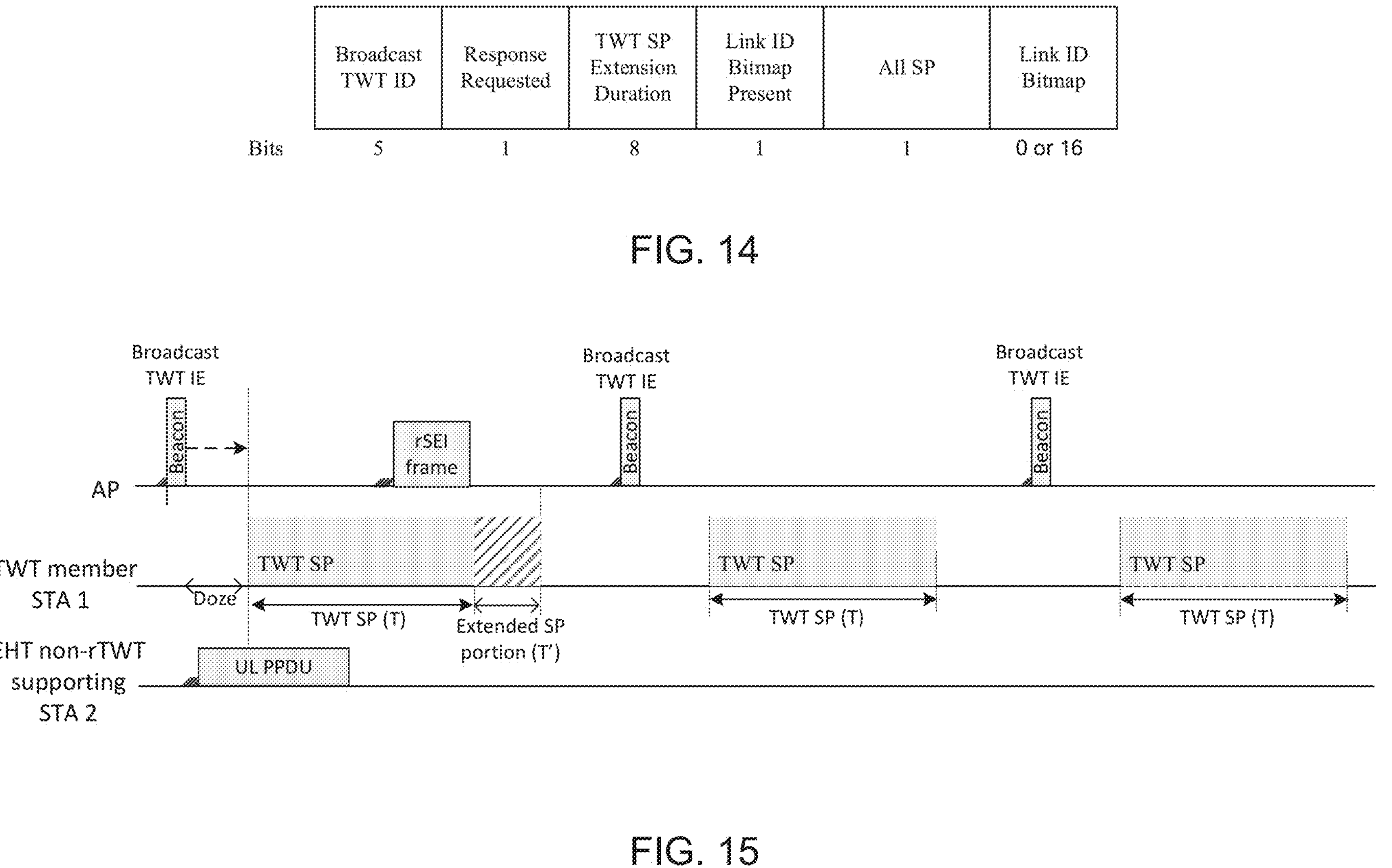
FIG. 14 illustrates an example format of the Restricted TWT SP Extension Information field in the Restricted TWT SP Extension Information frame that includes an All SP subfield according to embodiments of the present disclosure.
FIG. 15 illustrates an example of a restricted TWT SP extension applicable only for one restricted TWT SP according to embodiments of the present disclosure.

FIG. 14 illustrates an example format of the Restricted TWT SP Extension Information field in the Restricted TWT SP Extension Information frame that includes an All SP subfield according to embodiments of the present disclosure. The All SP subfield in the Restricted TWT SP Extension Information field indicates whether the corresponding restricted TWT SP extension is only applicable for one restricted TWT SP or for all subsequent restricted TWT SPs. If the All SP subfield is set to 0, it indicates that the corresponding restricted TWT SP extension is applicable only for one restricted TWT SP (as illustrated in FIG. 15). If the All SP subfield is set to 1, it indicates that the corresponding restricted TWT SP extension is applicable for all subsequent TWT SPs that start after the Restricted TWT SP Extension Information frame, which also includes the current TWT SP if the Restricted TWT SP Extension Information frame is received during an ongoing restricted TWT SP (as illustrated in FIG. 16).

FIG. 15 illustrates an example of a restricted TWT SP extension applicable only for one restricted TWT SP according to embodiments of the present disclosure.

Figure 16:
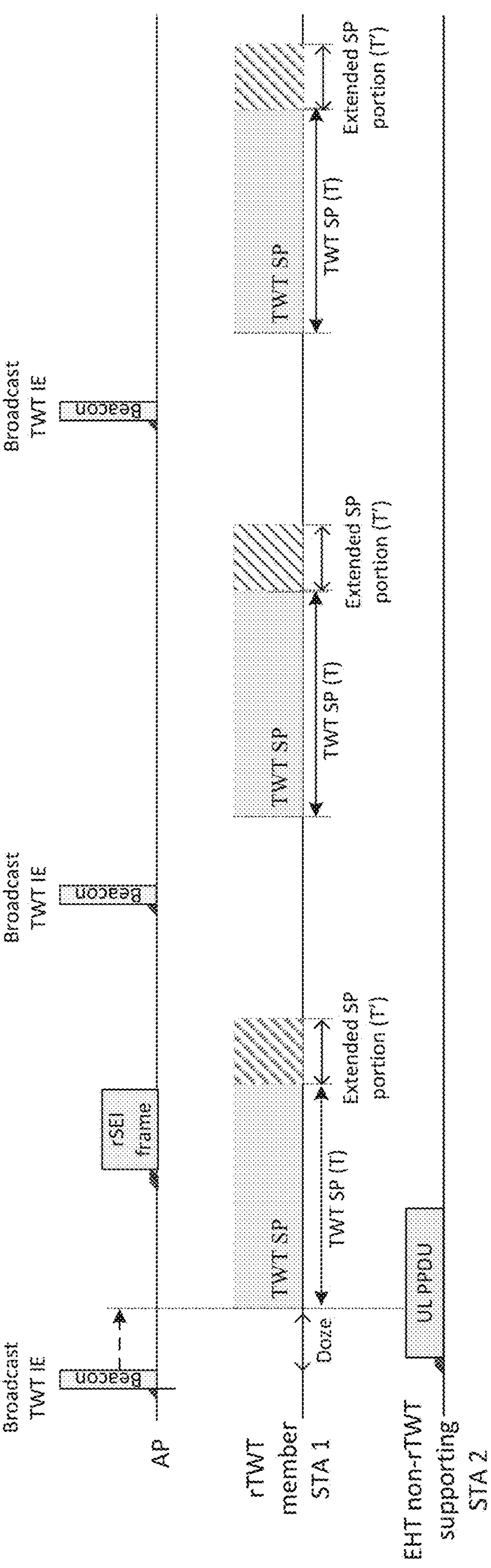
FIG. 16 illustrates an example of a restricted TWT SP extension applicable for all restricted TWT SPs according to embodiments of the present disclosure.

FIG. 16 illustrates an example of a restricted TWT SP extension applicable for all restricted TWT SPs according to embodiments of the present disclosure. In this example, the rSEI frame is received during a TWT SP, so that TWT SP is extended as well.

Figure 17A:
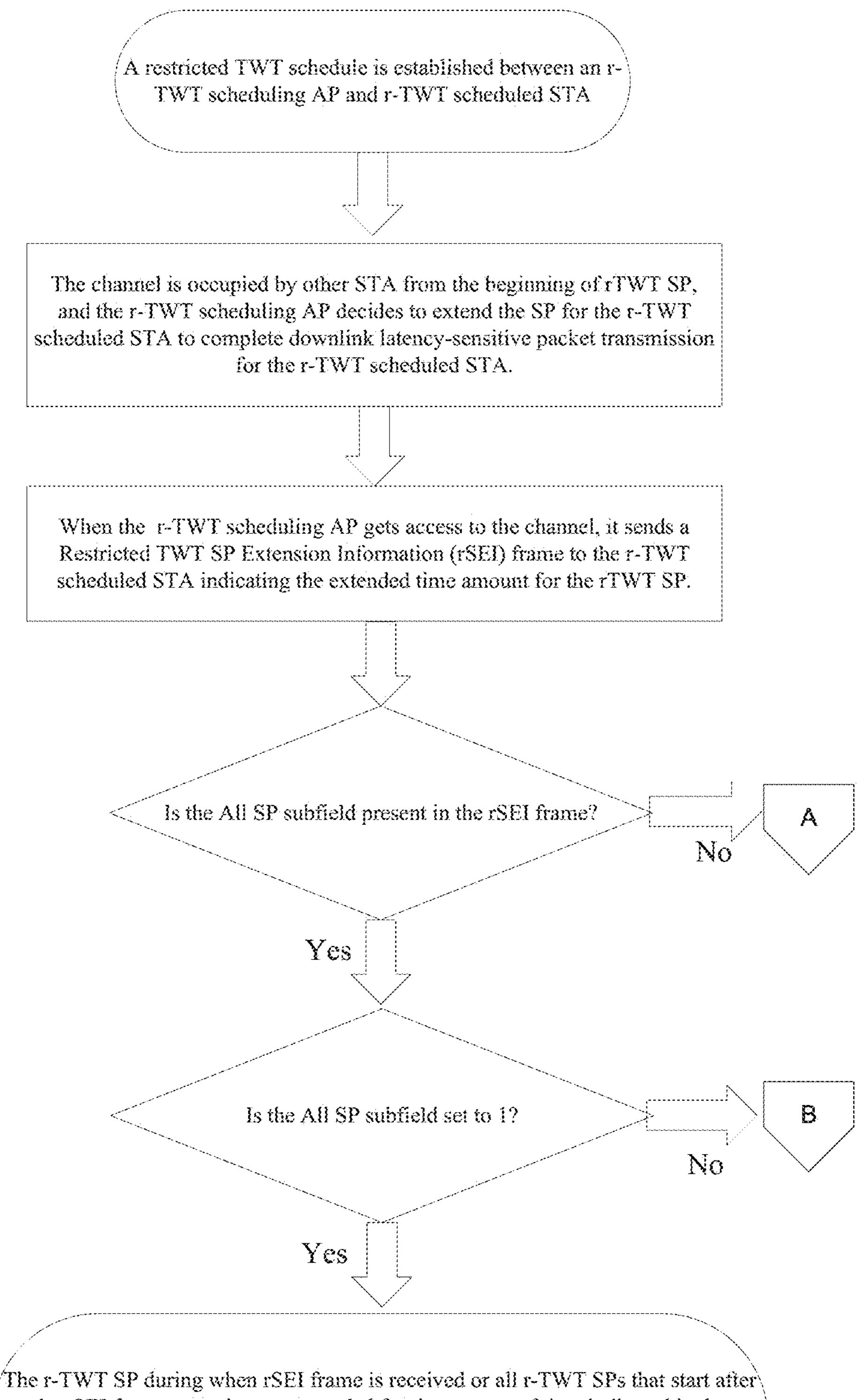
FIGS. 17A-17B illustrate an example procedure for the use of the All SP subfield in the Restricted TWT SP Extension Information frame according to embodiments of the present disclosure.
Figure 17B:
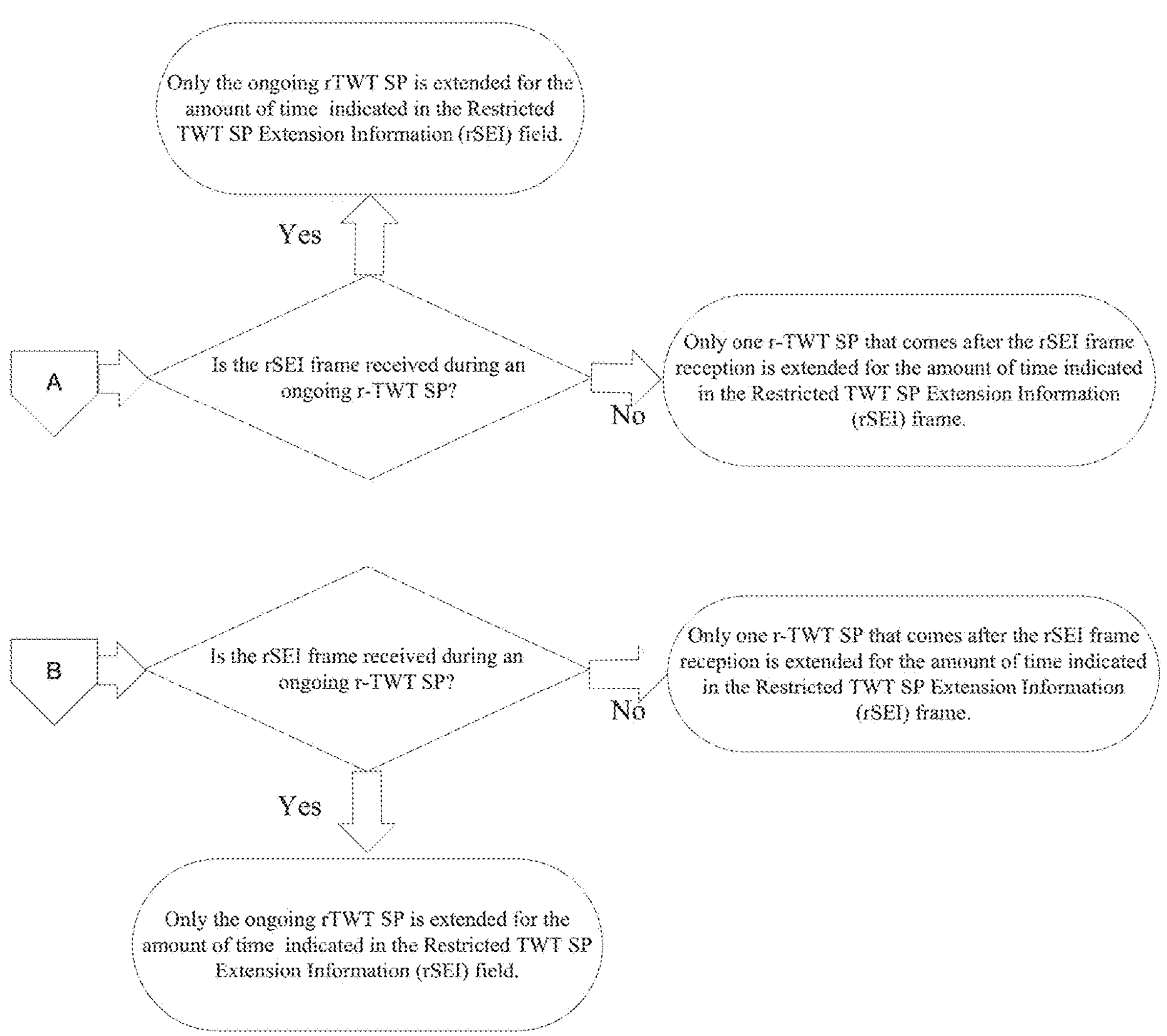

FIGS. 17A-17B illustrate an example procedure for the use of the All SP subfield in the Restricted TWT SP Extension Information frame according to embodiments of the present disclosure.

According to some embodiments, if there is a restricted TWT schedule established between an rTWT scheduling AP and an rTWT scheduled STA and the rTWT scheduled STA cannot finish an uplink PPDU transmission to the rTWT scheduling AP within the restricted TWT SP duration, then the rTWT scheduled STA may explicitly or implicitly indicate to the AP that the rTWT scheduled STA will stay awake an additional amount of time beyond the nominal restricted TWT SP end time so that it can finish transmitting the uplink latency-sensitive traffic to the rTWT scheduling AP. The uplink frame transmission time can exceed the duration indicated by AdjustedMinimumTWTWakeDuration.

Figure 18:
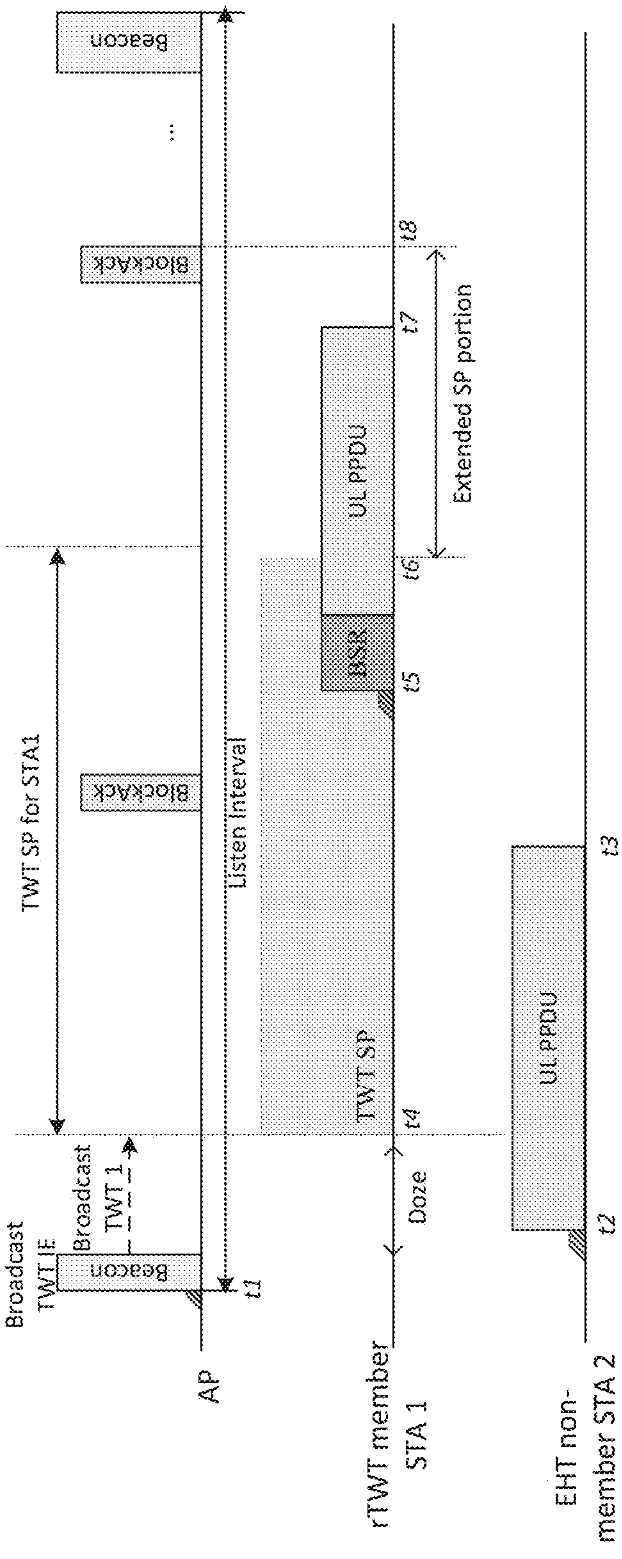
FIG. 18 illustrates an example of implicit indication of restricted TWT SP extension by the rTWT scheduled STA for uplink PPDU transmission according to embodiments of the present disclosure.

FIG. 18 illustrates an example of implicit indication of restricted TWT SP extension by the rTWT scheduled STA for uplink PPDU transmission according to embodiments of the present disclosure. According to this embodiment, if the rTWT scheduled STA cannot finish UL PPDU transmission to the rTWT scheduling AP within the restricted TWT SP duration, then the rTWT scheduled STA sends a Buffer Status Report (BSR) to the rTWT scheduling AP indicating the amount of packets remaining in the buffer corresponding to the latency-sensitive uplink TIDs that need to be transmitted during the restricted TWT SP. This is an implicit indication to the rTWT scheduling AP that the rTWT scheduled STA may need to stay awake beyond the nominal SP end time so that the rTWT scheduled STA can finish transmitting uplink latency-sensitive PPDUs.

According to another embodiment, in order to indicate that the rTWT scheduled STA will need to stay awake beyond the nominal SP end time, the rTWT scheduled STA sends a non-empty buffer to the AP towards the nominal SP end time and the buffer corresponds to any of the TIDs that have been negotiated for the corresponding restricted TWT schedule. This is another implicit indication to the rTWT scheduling AP about the need for restricted TWT SP extension by the rTWT scheduled STA.

Figure 19:
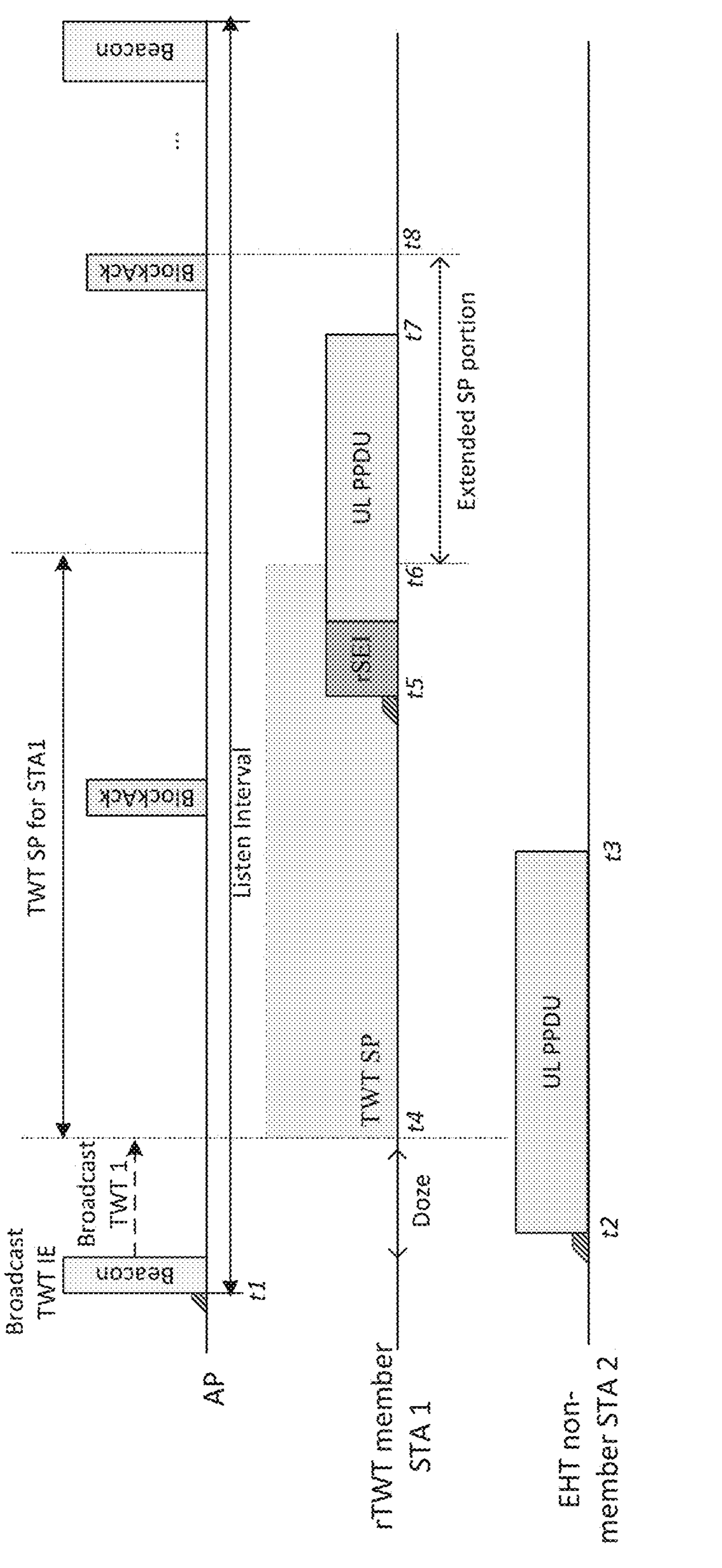
FIG. 19 illustrates an example of explicit indication of restricted TWT SP extension by the rTWT scheduled STA using a Restricted TWT SP Extension Information frame according to embodiments of the present disclosure.

FIG. 19 illustrates an example of explicit indication of restricted TWT SP extension by the rTWT scheduled STA using a Restricted TWT SP Extension Information frame according to embodiments of the present disclosure. According to this example, if the rTWT scheduled STA cannot finish the UL PPDU transmission to the rTWT scheduling AP within the restricted TWT SP duration, then the rTWT scheduled STA sends a Restricted TWT SP Extension Information (rSEI) frame to the corresponding rTWT scheduling AP notifying that the rTWT scheduled STA will stay awake additional amount of time beyond the nominal restricted TWT SP end time so that the rTWT scheduled STA can finish transmitting the uplink latency-sensitive traffic to the rTWT scheduling AP. This is an explicit notification to the rTWT scheduling AP from the rTWT scheduled STA about the additional wake time beyond the nominal restricted TWT SP end time. The reception of the rSEI frame by the rTWT scheduling AP is an indication that the rTWT scheduled STA needs to stay awake beyond the nominal SP end time so that rTWT scheduled STA can finish transmitting uplink latency sensitive traffic to the rTWT scheduling AP. The frame will contain all the necessary information about the restricted TWT SP extension time.

In the example of FIG. 19, STA1 and STA2 are two STAs associated with the AP. The AP transmits a Beacon frame containing a TWT element with a Restricted TWT Parameter Set field corresponding to a restricted TWT schedule. STA1 is an rTWT scheduled STA that has established the restricted TWT schedule with the associated rTWT scheduling AP. The wake time value indicated in the Target Wake Time field in the Restricted TWT Parameter Set field corresponding to the restricted TWT schedule is set as t4, and based on the Nominal Minimum TWT Wake Duration field value, the nominal TWT SP end time is t5. STA2 is a STA that does not support restricted TWT operation. STA2 starts transmitting a UL PPDU at time t2 and continues the transmission until time t3 exceeding the restricted TWT SP start time t4. Although STA1 has uplink latency-sensitive BUs for the AP, due to frame exchanges between STA2 and the AP, STA1 cannot start transmitting the uplink PPDU to the AP until time t5. In order to complete the uplink PPDU transmission, STA1 needs additional time beyond the nominal restricted TWT SP end time, t6. In order to indicate that STA1 will need to stay awake until time t8, STA1 sends a Restricted TWT SP Extension Information frame to the AP that indicates the SP extension time. Upon reception by STA1 of the BlockAck from the AP (corresponding to the UL PPDU transmitted by STA1), STA1 goes to doze state.

According to one embodiment, when an rTWT scheduled STA sends an rSEI frame to the rTWT scheduling AP it is regarded as an rTWT SP extension request. Upon receiving this request, the rTWT scheduling AP sends another Restricted TWT SP Extension Information frame to the rTWT scheduled STA as a response. If the rTWT scheduling AP indicates in the response frame that the request has been accepted, then this indicates to the rTWT scheduled STA that it can keep transmitting uplink latency-sensitive traffic beyond the nominal SP end time. According to one embodiment, if the value in the TWT SP Extension Duration field in the corresponding rSEI response frame transmitted by the rTWT scheduling AP is the same as the value indicated in the TWT SP Extension Duration field in the rSEI request frame transmitted by the rTWT scheduled STA, then this indicates that the rTWT scheduling AP has accepted the request of the rTWT scheduled STA for SP extension for an additional duration requested by the rTWT scheduled STA. According to another embodiment, if the TWT SP Extension Duration field value in the rSEI response transmitted by the rTWT scheduling AP is different (but not 0) from the TWT SP Extension Duration field value in the rSEI request frame transmitted by the rTWT scheduled STA, then this indicates that the rTWT scheduling AP has granted the SP extension but with an alternative SP extension duration value than the one requested by the rTWT scheduled STA. According to another embodiment, if the TWT SP Extension Duration field value in the rSEI response frame transmitted by the rTWT scheduling AP is set as 0, then this indicates that the rTWT scheduling AP has rejected the rTWT SP extension request made by the rTWT scheduled STA.

According to one embodiment, both the restricted TWT SP extension request and response frames are transmitted as individually addressed frames. According to another embodiment, the restricted TWT SP extension request frame is transmitted as an individually addressed frame but the restricted TWT SP extension response frame and an rSEI frame transmitted by the rTWT scheduling AP as an unsolicited response frame are transmitted as broadcast frames.

According to one embodiment, upon reception of an rSEI frame transmitted by the rTWT scheduling AP (as a response to an rSEI request frame or as an unsolicited response frame), the EHT STAB that support restricted TWT operation—other than the rTWT scheduled STA for which the SP extension is intended—shall end their TXOP before the start of the extended TWT SP portion.

According to one embodiment, if the act of rTWT SP extension has the potential to result in overlap with another rTWT SP, then the rTWT scheduling AP should not perform the rTWT SP extension. According to another embodiment, if an rTWT SP (e.g., SP1) corresponding to an rTWT schedule (e.g., Schedule1) is extended such that the extended portion overlaps with another rTWT SP (e.g., SP2) corresponding to another rTWT schedule (e.g., Schedule2), then the members of Schedule1 do not need to end their TXOP at the start of SP2 if those members were involved in latency-sensitive frame exchanges corresponding to the TIDs negotiated for Schedule1 at the time of the start time of SP2—those members of Schedule1 can also ignore the overlapping Quiet interval corresponding to SP2. According to another embodiment, the members of Schedule1 should end their TXOP before the start of SP2 if those members were involved in latency-tolerant frame exchanges with TIDs not corresponding to the TIDs negotiated for Schedule1 at the start time of SP2. Other rTWT supporting STAs in the BSS that are neither the members of Schedule1 nor the members of Schedule2 shall end their TXOP before the start of SP2.

According to some embodiments, the Restricted TWT SP Extension Information frame may not have any extended SP end time information. According to one such embodiment, if a request for SP extension has been accepted, then the rTWT scheduled STA remains awake beyond the nominal SP end time until the rTWT scheduling AP terminates the SP by, for example, sending a QoS Data or QoS Null frame with EOSP subfield set to 1, or by sending any individually addressed frame with More Data field equal to 0.

Figure 20:
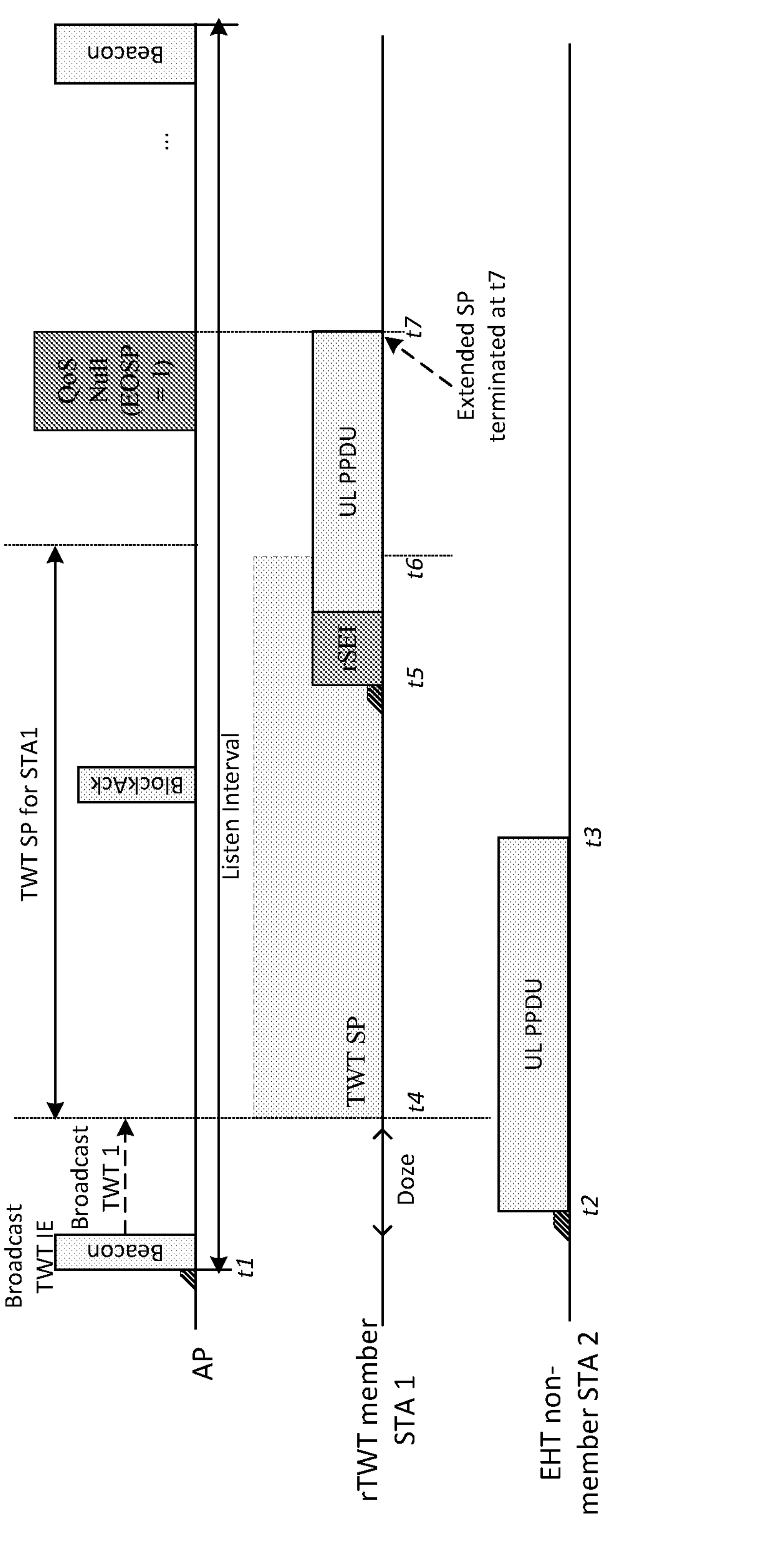
FIG. 20 illustrates an example of an rTWT scheduled STA staying awake during an extended SP until the rTWT scheduling AP explicitly terminates the SP according to embodiments of the present disclosure.

FIG. 20 illustrates an example of an rTWT scheduled STA staying awake during an extended SP until the rTWT scheduling AP explicitly terminates the SP according to embodiments of the present disclosure. In this example, the STA has explicitly requested extension of the SP using an rSEI frame, and the AP explicitly terminates the SP by sending a QoS Null frame with EOSP subfield set to 1.

Figure 21:
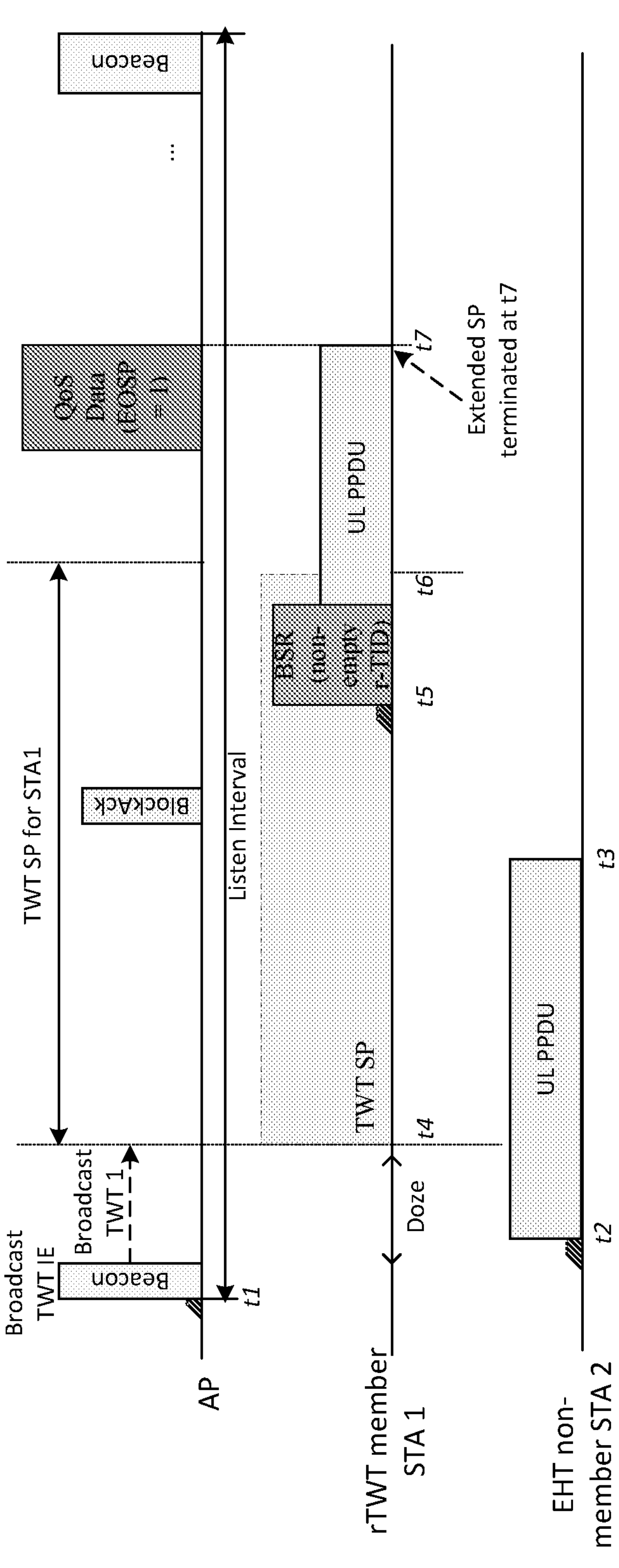
FIG. 21 illustrates another example of an rTWT scheduled STA staying awake during an extended SP until the rTWT scheduling AP explicitly terminates the SP according to embodiments of the present disclosure.

FIG. 21 illustrates another example of an rTWT scheduled STA staying awake during an extended SP until the rTWT scheduling AP explicitly terminates the SP according to embodiments of the present disclosure. In this example, the STA has implicitly requested extension of the SP using a BSR, and the AP explicitly terminates the SP by sending a QoS Data frame with EOSP subfield set to 1.

Figures 22, 23:
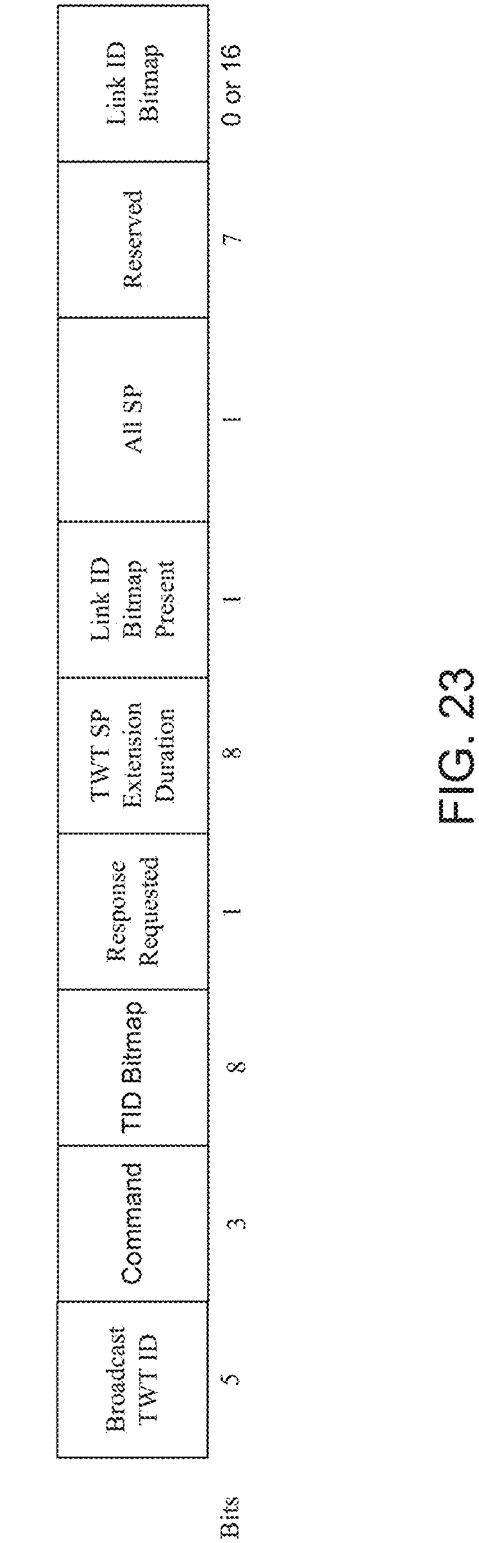
FIG. 22 illustrates another example format of the Restricted TWT SP Extension Information field in the Restricted TWT SP Extension Information frame according to embodiments of the present disclosure.
FIG. 23 illustrates another example format of the Restricted TWT SP Extension Information field in the Restricted TWT SP Extension Information frame according to embodiments of the present disclosure.

FIG. 22 illustrates another example format of the Restricted TWT SP Extension Information field in the Restricted TWT SP Extension Information frame according to embodiments of the present disclosure. The definition of fields other than the Command field may be the same as in the example of FIG. 14. The encoding of the Command field is described in Table 4.

TABLE 4

| Value | Meaning | Notes |
|---|---|---|
| 0 | Request the receiver of the frame to extend the SP for the transmitter of the frame for all latency-sensitive TIDs negotiated during restricted TWT setup. The extension would be until an SP termination event has occurred or until the requester sends an indication that its buffer corresponding to all latency sensitive TIDs are empty (for example, by sending BSR). According to an embodiment, only the rTWT scheduled STA can set the Command field equal to 0, and rTWT scheduling AP does not set this Command field value to 0. | TWT SP Extension Duration field is Reserved (according to one embodiment) or set to 0 value (according to another embodiment) |
| 1 | Request the receiver of the frame to extend the SP for the transmitter of the frame for all latency-sensitive TIDs negotiated during restricted TWT setup. The SP extension would be for the duration indicated in the TWT SP Extension Duration field. According to an embodiment, only the rTWT scheduled STA can set the Command field equal to 1, and rTWT scheduling AP does not set this Command field value to 1. | |
| 2 | Notify the receiver of the frame that the rTWT SP has been extended for the duration as indicated in the TWT SP Extension Duration field or extended until the SP has been terminated explicitly. In the latter case, the TWT SP Extension Duration field is set to 0. According to an embodiment, only the rTWT scheduling AP can set the Command field equal to 2, and rTWT scheduled STA does not set this Command field value to 2. | |
| 3-7 | Reserved | |

An alternative encoding of the Command field is described in Table 5.

TABLE 5

| Value | Meaning | Notes |
|---|---|---|
| 0 | Request the receiver of the frame to extend the SP for the transmitter of the frame for all latency-sensitive TIDs negotiated during restricted TWT setup. The extension would be until an SP termination event has occurred or until the requester sends an indication that its buffer corresponding to all latency sensitive TIDs are empty (for example, by sending BSR). According to an embodiment, only the rTWT scheduled STA can set the Command field equal to 0, and rTWT scheduling AP does not set this Command field value to 0. | TWT SP Extension Duration field is reserved (according to one embodiment) or set to 0 value (according to another embodiment) |
| 1 | Request the receiver of the frame to extend the SP for the transmitter of the frame for all latency-sensitive TIDs negotiated during restricted TWT setup. The SP extension would be for the duration indicated in the TWT SP Extension Duration field. According to an embodiment, only the rTWT scheduled STA can set the Command field equal to 1, and rTWT scheduling AP does not set this Command field value to 1. | |
| 2 | Notify the receiver of the frame that the rTWT SP has been extended for the duration as indicated in the TWT SP Extension Duration field or extended until the SP has been terminated explicitly. In the latter case, the TWT SP Extension Duration field is set to 0. The sender of the frame may not wait for the reception of an Ack from the receiver before the sender extended extends the SP. According to an embodiment, only the rTWT scheduling AP can set the Command field equal to 2, and rTWT scheduled STA does not set this Command field value to 2. | The Response Requested subfield is Reserved. |
| 3 | Notify the receiver of the frame that the rTWT SP has been extended for the duration as indicated in the TWT SP Extension Duration field or extended until the SP has been terminated explicitly. In the latter case, the TWT SP Extension Duration field is set to 0. | The Response Requested subfield is set to 1. |

TABLE 5-continued

| Value | Meaning | Notes |
|---|---|---|
| | The sender of the frame shall wait for the reception of an Ack from the receiver before the sender extended extends the SP. If the sender does not receive an Ack, then it will not extend the SP. According to an embodiment, only the rTWT scheduling AP can set the Command field equal to 2, and rTWT scheduled STA does not set this Command field value to 2. | |
| 4-7 | Reserved | |

According to another embodiment, SP extension can be performed on a per-TID basis. According to this embodiment, a TID bitmap is present in the Restricted TWT SP Extension Information field in the Restricted TWT SP Extension Information frame. This is shown in FIG. 23.

FIG. 23 illustrates another example format of the Restricted TWT SP Extension Information field in the Restricted TWT SP Extension Information frame according to embodiments of the present disclosure. The TID bitmap indicates the TIDs (among the set of latency-sensitive TIDs negotiated for the corresponding restricted TWT schedule) for which the SP extension is requested or SP extension is being negotiated. The encoding of the Command field according to this example is described in Table 6.

TABLE 6

| Value | Meaning | Notes |
|---|---|---|
| 0 | Request the receiver of the frame to extend the SP for the transmitter of the frame for all latency-sensitive TIDs negotiated during restricted TWT setup. The extension would be until an SP termination event has occurred or until the requester sends an indication that its buffer corresponding to all latency sensitive TIDs are empty (for example, by sending BSR). According to an embodiment, only the rTWT scheduled STA can set the Command field equal to 0, and rTWT scheduling AP does not set this Command field value to 0 | TWT SP Extension Duration field is reserved (according to one embodiment) or set to 0 value (according to another embodiment). TID Bitmap field is reserved (according to one embodiment) or all set to 1 (according to another embodiment). |
| 1 | Request the receiver of the frame to extend the SP for the transmitter of the frame for all latency-sensitive TIDs negotiated during restricted TWT setup. The SP extension would be for the duration indicated in the TWT SP Extension Duration field. According to an embodiment, only the rTWT scheduled STA can set the Command field equal to 1, and rTWT scheduling AP does not set this Command field value to 1. | TID Bitmap field is reserved (according to one embodiment) or all set to 1 (according to another embodiment). |
| 2 | Notify the receiver of the frame that the rTWT SP has been extended for the duration as indicated in the TWT SP Extension Duration field or extended until the SP has been terminated explicitly. In the latter case, the TWT SP Extension Duration field is set to 0. This extension is for all latency-sensitive TIDs negotiated during restricted TWT setup. The sender of the frame may not wait for the reception of an Ack from the receiver before the sender extended extends the SP. According to an embodiment, only the rTWT scheduling AP can set the Command field equal to 2, and rTWT scheduled STA does not set this Command field value to 2 | The Response Requested subfield is Reserved. TID Bitmap field is reserved (according to one embodiment) or all set to 1 (according to another embodiment). |
| 3 | Notify the receiver of the frame that the rTWT SP has been extended for the duration as indicated in the TWT SP Extension Duration field or extended until the SP has been terminated explicitly. In the latter case, the TWT SP Extension Duration field is set to 0. This extension is for all latency-sensitive TIDs negotiated during restricted TWT setup. The sender of the frame shall wait for the reception of an Ack from the receiver before the sender extended extends the SP. If the sender does not receive an Ack, then it will not extend the SP. | The Response Requested subfield is set to 1. TID Bitmap field is reserved (according to one embodiment) or all set to 1 (according to another embodiment). |

TABLE 6-continued

| Value | Meaning | Notes |
|---|---|---|
| | According to an embodiment, only the rTWT scheduling AP can set the Command field equal to 2, and rTWT scheduled STA does not set this Command field value to 2 | |
| 4 | Request the receiver of the frame to extend the SP for the transmitter of the frame for latency-sensitive TIDs negotiated during restricted TWT setup and SP extension is for the TIDs indicated in the TID Bitmap subfield. The extension would be until an SP termination event has occurred or until the requester sends an indication that its buffer corresponding to all latency sensitive TIDs are empty (for example, by sending BSR). According to an embodiment, only the rTWT scheduled STA can set the Command field equal to 0, and rTWT scheduling AP does not set this Command field value to 0. | TWT SP Extension Duration field is reserved (according to one embodiment) or set to 0 value (according to another embodiment). |
| 5 | Request the receiver of the frame to extend the SP for the transmitter of the frame for latency-sensitive TIDs negotiated during restricted TWT setup and SP extension is for the TIDs indicated in the TID Bitmap subfield. The SP extension would be for the duration indicated in the TWT SP Extension Duration field. According to an embodiment, only the rTWT scheduled STA can set the Command field equal to 1, and rTWT scheduling AP does not set this Command field value to 1. | |
| 6 | Notify the receiver of the frame that the rTWT SP has been extended for the duration as indicated in the TWT SP Extension Duration field or extended until the SP has been terminated explicitly. In the latter case, the TWT SP Extension Duration field is set to 0. The SP extension is for the TIDs indicated in the TID Bitmap subfield. The sender of the frame may not wait for the reception of an Ack from the receiver before the sender extended extends the SP. According to an embodiment, only the rTWT scheduling AP can set the Command field equal to 2, and rTWT scheduled STA does not set this Command field value to 2. | The Response Requested subfield is Reserved. |
| 7 | Notify the receiver of the frame that the rTWT SP has been extended for the duration as indicated in the TWT SP Extension Duration field or extended until the SP has been terminated explicitly. In the latter case, the TWT SP Extension Duration field is set to 0. The SP extension is for the TIDs indicated in the TID Bitmap subfield. The sender of the frame shall wait for the reception of an Ack from the receiver before the sender extended extends the SP. If the sender does not receive an Ack, then it will not extend the SP. According to an embodiment, only the rTWT scheduling AP can set the Command field equal to 2, and rTWT scheduled STA does not set this Command field value to 2. | The Response Requested subfield is set to 1. |

According to one embodiment, an rTWT SP can be extended even if the extended rTWT SP overlaps with another rTWT SP. According to this embodiment, regardless of whether the rTWT SP (e.g., the first rTWT SP), after extension, overlaps in time with another rTWT SP (e.g., the second rTWT SP), the first rTWT SP can be extended.

According to one embodiment, the rTWT scheduling AP can extend an rTWT SP corresponding to an rTWT schedule for all the rTWT scheduled STAs that are member of the rTWT schedule. According to another embodiment, the rTWT SP is extended for a particular rTWT scheduled STA, for example, for enabling the rTWT scheduled STA to finish its latency-sensitive traffic.

Figure 24:
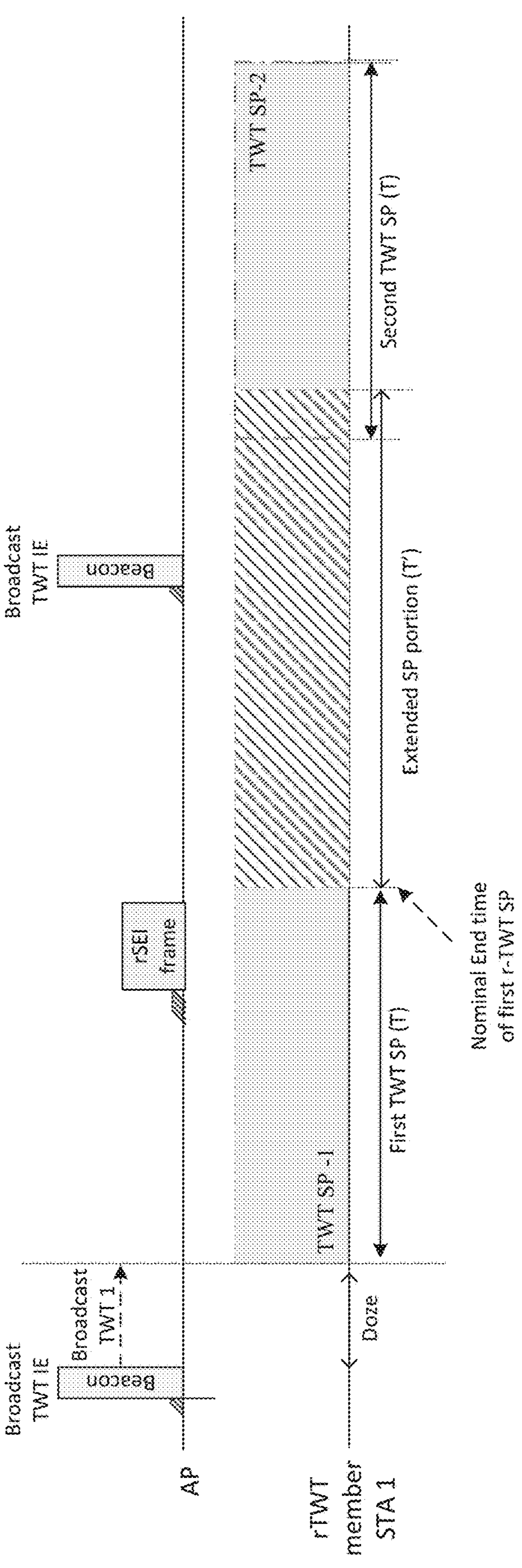
FIG. 24 illustrates an example of extension of rTWT SP when both overlapping rTWT SPs belong to the same rTWT schedule according to embodiments of the present disclosure.

According to one embodiment, when an rTWT SP (e.g., the first rTWT SP) is extended for an rTWT scheduled STA, the extension can be such that the first rTWT SP, after extension, overlaps in time with a second rTWT SP if both the first rTWT SP and the second rTWT SP correspond to the same rTWT schedule. FIG. 24 illustrates this embodiment.

FIG. 24 illustrates an example of extension of rTWT SP when both overlapping rTWT SPs belong to the same rTWT schedule according to embodiments of the present disclosure. In this example, the TWT SP-1 is extended for STA 1 such that it overlaps with TWT SP-2. TWT SP-1 and TWT SP-2 are SPs of the same rTWT schedule, and thus the overlap is allowed.

According to another embodiment, when an rTWT SP (e.g., the first rTWT SP) is extended for an rTWT scheduled STA, the first rTWT SP can be extended such that it does not overlap, in time, with the second rTWT SP even when both the first rTWT SP and the second rTWT SP correspond to the same rTWT schedule.

Figure 25:
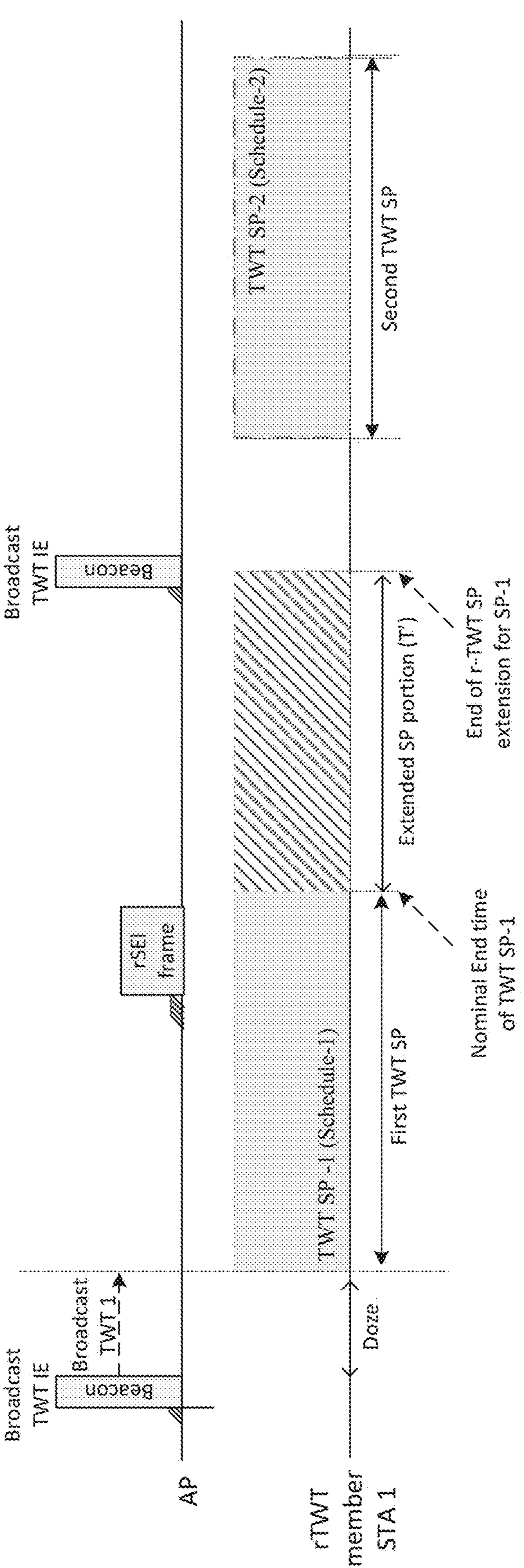
FIG. 25 illustrates an example of ending an rTWT SP extension before the start of another rTWT SP when both rTWT SPs belong to different rTWT schedules according to embodiments of the present disclosure.

According to another embodiment, if the first rTWT SP and the second rTWT SP correspond to different rTWT schedules, then the first rTWT SP can be extended such that, after the extension, the first rTWT SP does not overlap with the second rTWT SP. FIG. 25 illustrates this embodiment.

FIG. 25 illustrates an example of ending an rTWT SP extension before the start of another rTWT SP when both rTWT SPs belong to different rTWT schedules according to embodiments of the present disclosure. In this example, TWT SP-1 belongs to TWT Schedule-1 and TWT SP-2 belongs to TWT Schedule-2. According to this embodiment, the rTWT SP extension of TWT SP-1 stops before the start time of the TWT SP-2 since TWT SP-2 belongs to a different TWT schedule.

According to another embodiment, if the first rTWT SP and the second rTWT SP correspond to different rTWT schedules, the first rTWT SP can be extended such that, after the extension, the first rTWT SP overlaps with the second rTWT SP, if the rTWT scheduled STA for which the first rTWT SP is extended is also a member of a second rTWT schedule corresponding to the second rTWT SP. According to this embodiment, in reference to FIG. 25, if STA 1 is a member of both the first rTWT schedule and the second rTWT schedule, then the first rTWT SP can be extended such that after extension the first rTWT SP overlaps in time with the second rTWT SP.

According to another embodiment, if the first rTWT SP and the second rTWT SP correspond to different rTWT schedules, and if, during the rTWT setup process, the same set of TIDs are negotiated for both rTWT schedules corresponding to the two rTWT SPs, then the first rTWT SP can be extended such that, after the extension, the first rTWT SP overlaps, in time, with the second rTWT SP.

According to one embodiment, if an rTWT SP is extended for a member rTWT scheduled STA, then the rTWT scheduled STA and rTWT scheduling AP can continue frame exchanges during the extended portion of the rTWT SP.

According to another embodiment, if an rTWT SP (the first rTWT SP) is extended for a member rTWT scheduled STA, then the rTWT scheduled STA can continue frame exchanges during the extended portion of the rTWT SP (the first rTWT SP), but it needs to end its TXOP before the start time of a second rTWT SP even if the first rTWT SP, after SP extension, overlaps in time with the second rTWT SP. According to another embodiment, the STA can continue frame exchanges during the overlapped SP portion as well.

According to another embodiment, if an rTWT SP (the first rTWT SP) is extended for a member rTWT scheduled STA such that, after extension, the first rTWT SP overlaps in time with a second rTWT SP, then the rTWT scheduled STA does not need to end its TXOP before the start time of the second rTWT SP if both rTWT SPs correspond to the same rTWT schedule.

According to another embodiment, if an rTWT SP (the first rTWT SP) is extended for a member rTWT scheduled STA (STA-1) such that after extension, the first rTWT SP overlaps in time with a second rTWT SP, and if the first rTWT SP and the second rTWT SP belong to two different rTWT schedules, then STA-1 needs to end its TXOP before the start time of the second rTWT SP.

According to another embodiment, if an rTWT SP (the first rTWT SP) is extended for a member rTWT scheduled STA (STA-1) such that after extension, the first rTWT SP overlaps in time with a second rTWT SP, and if the first rTWT SP and the second rTWT SP belong to two different rTWT schedules, then STA-1 can continue its transmission and does not need to end its TXOP before the start time of the second rTWT SP if the TIDs negotiated for the first rTWT SP are also negotiated for the second rTWT SP. According to another embodiment, for the above scenario, STA-1 does not need to end its TXOP if a subset of TIDs that are negotiated for the first rTWT SP are also the subset of TIDs that are negotiated for the second rTWT SP. According to another embodiment, for the above scenario, STA-1 does not need to end its TXOP if all of the TIDs that are negotiated for the second rTWT SP form a subset of TIDs that are negotiated for the first rTWT SP.

According to another embodiment, if an rTWT SP (the first rTWT SP) is extended for a member rTWT scheduled STA (STA-1) such that after extension, the first rTWT SP overlaps in time with a second rTWT SP, and if the first rTWT SP and the second rTWT SP belong to two different rTWT schedules, then STA-1 can continue its transmission and does not need to end its TXOP before the start time of the second rTWT SP if STA-1 is a member of both rTWT schedules.

According to one embodiment, when an rTWT SP is extended, during the extended portion of the rTWT SP the rTWT scheduled STA and rTWT scheduling AP follow the rules defined for restricted TWT operation.

According to one embodiment, during the extended portion of the rTWT SP the STAs may not be allowed to transmit frames corresponding to the TIDs that are not negotiated for the rTWT schedule corresponding to the rTWT SP. According to another embodiment, during the extended portion of the rTWT SP the STAs are allowed to transmit frames corresponding to the TIDs that are not originally negotiated for the rTWT schedule corresponding to the rTWT SP.

According to another embodiment, the above embodiments related to rTWT SP extension are applicable for either or both of the non-trigger enabled rTWT case and the trigger-enabled rTWT case.

Figure 26A:
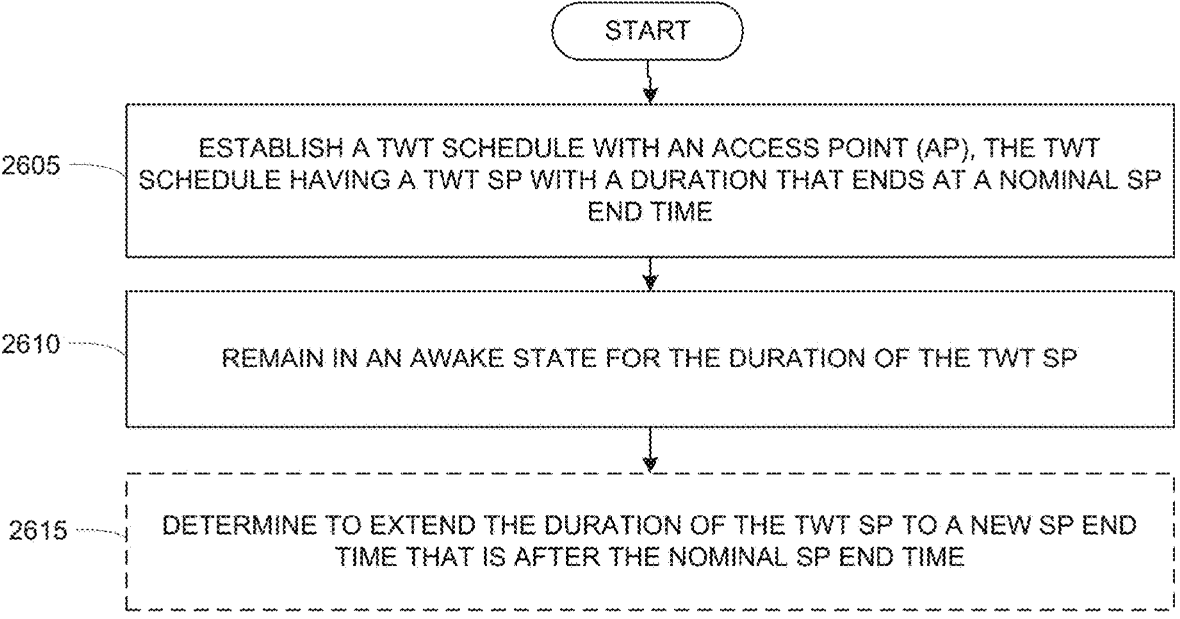
FIGS. 26A-26B illustrate an example of a process for extending the duration of a TWT SP according to various embodiments of the present disclosure.
Figure 26B:
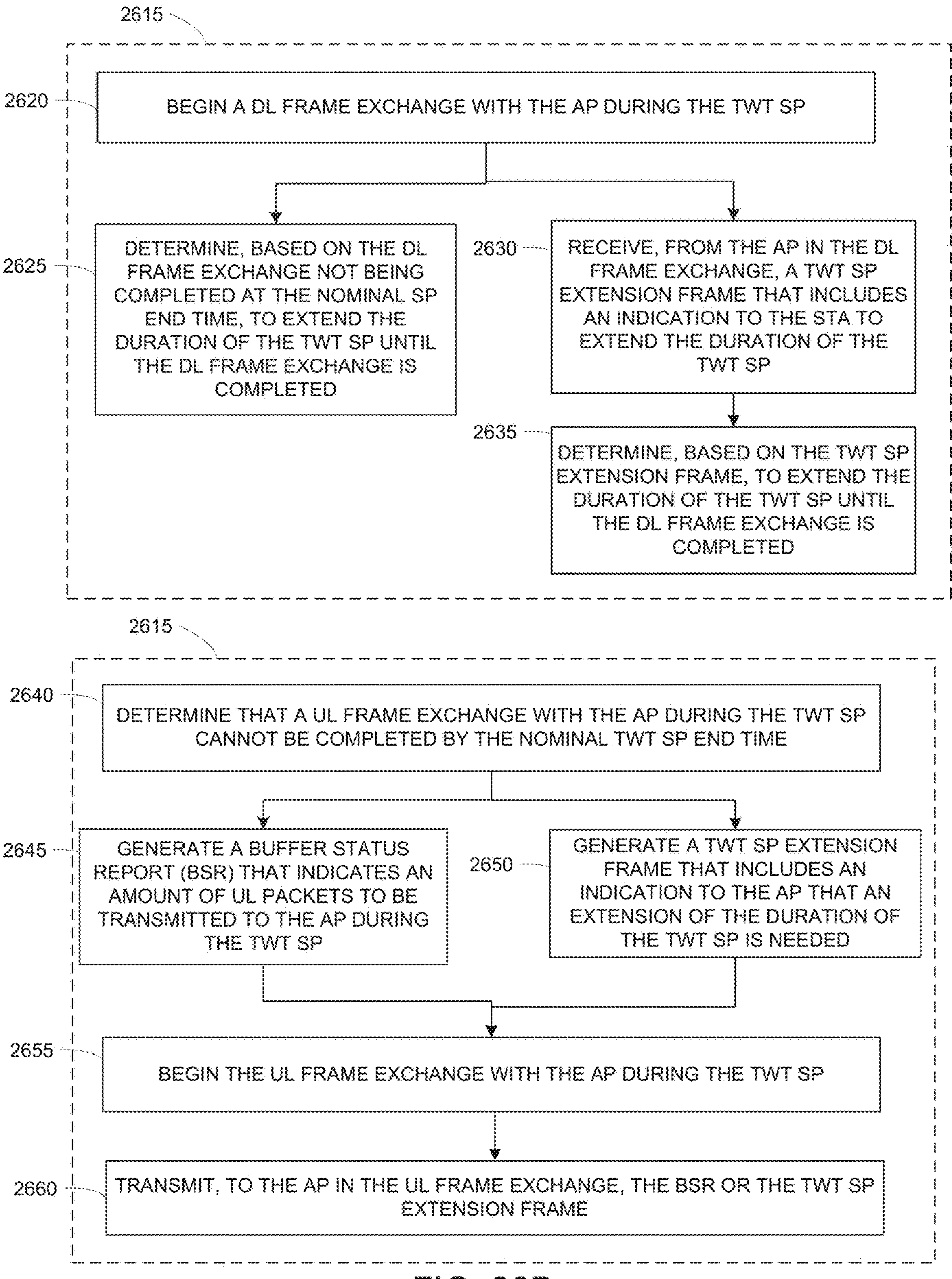

FIGS. 26A-26B illustrate an example of a process for extending the duration of a TWT SP according to various embodiments of the present disclosure. The process of FIGS. 26A-26B is discussed as being performed by a STA, but it is understood that a corresponding AP performs a corresponding process. For convenience, the process of FIGS. 26A-26B is discussed as being performed by a WI-FI STA associated with a WI-FI AP. However, it is understood that any suitable wireless communication device could perform these processes.

Referring to FIG. 26A, the process begins with the STA establishing a TWT schedule with an AP (step 2605). The TWT schedule has a TWT SP with a duration that ends at a nominal SP end time. The STA remains in an awake state for the duration of the TWT SP (step 2610).

The STA then determines to extend the duration of the TWT SP to a new SP end time that is after the nominal SP end time (step 2615). This step may be implemented differently according to various embodiments of the present disclosure. FIG. 26B illustrates some of these embodiments of step 2615.

Referring to FIG. 26B, after step 2610 for cases involving DL communications the STA begins a DL frame exchange with the AP during the TWT SP (step 2620). In some embodiments, the STA may then determine, based on the DL frame exchange not being completed at the nominal SP end time, to extend the duration of the TWT SP until the DL frame exchange is completed (step 2625).

In other embodiments, after step 2620 the STA may receive, from the AP in the DL frame exchange, a TWT SP extension frame that includes an indication to the STA to extend the duration of the TWT SP (step 2630). The STA then determines, based on the TWT SP extension frame, to extend the duration of the TWT SP until the DL frame exchange is completed.

Alternatively, after step 2610 for cases involving UL communications the STA determines that a UL frame exchange with the AP during the TWT SP cannot be completed by the nominal TWT SP end time (step 2640). In some embodiments, the STA may then generate a BSR that indicates an amount of UL packets to be transmitted to the AP during the TWT SP (step 2645). In other embodiments, after step 2640 the STA may generate a TWT SP extension frame that includes an indication to the AP that an extension of the duration of the TWT SP is needed (step 2650).

After either step 2645 or step 2650, the STA begins the UL frame exchange with the AP during the TWT SP (step 2655). The STA transmits, to the AP in the UL frame exchange, the BSR or the TWT SP extension frame (step 2660).

The above flowchart illustrates an example method or process that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A wireless station (STA) device comprising:
a transceiver configured to:
establish a target wake time (TWT) schedule with an access point (AP), the TWT schedule having a TWT service period (SP) with a duration that ends at a nominal SP end time, and
remain in an awake state for the duration of the TWT SP; and
a processor operably coupled to the transceiver, the processor configured to determine to extend the duration of the TWT SP over a first link based on a transmission of a frame having extension information in a frame exchange over a second link to a new SP end time indicated in the extension information that is after the nominal SP end time to complete the transmission of the frame.

2. The STA of claim 1, wherein:
the transceiver is further configured to begin a downlink (DL) frame exchange with the AP during the TWT SP, and
the processor is further configured to determine, based on the DL frame exchange not being completed at the nominal SP end time, to extend the duration of the TWT SP until the DL frame exchange is completed.

3. The STA of claim 1, wherein:
the transceiver is further configured to:
begin a DL frame exchange with the AP during the TWT SP; and
receive, from the AP in the DL frame exchange, a TWT SP extension frame that includes an indication to the STA to extend the duration of the TWT SP, and
the processor is further configured to determine, based on the TWT SP extension frame, to extend the duration of the TWT SP until the DL frame exchange is completed.

4. The STA of claim 1, wherein:
the processor is further configured to:
determine that an uplink (UL) frame exchange with the AP during the TWT SP cannot be completed by the nominal TWT SP end time; and
generate a buffer status report (BSR) that indicates an amount of UL packets to be transmitted to the AP during the TWT SP, and
the transceiver is further configured to:
begin the UL frame exchange with the AP during the TWT SP; and
transmit, to the AP in the UL frame exchange, the BSR.

5. The STA of claim 1, wherein:
the processor is further configured to:
determine that a UL frame exchange with the AP during the TWT SP cannot be completed by the nominal TWT SP end time; and
generate a TWT SP extension frame that includes an indication to the AP that an extension of the duration of the TWT SP is needed, and
the transceiver is further configured to:
begin the UL frame exchange with the AP during the TWT SP; and
transmit, to the AP in the UL frame exchange, the TWT SP extension frame.

6. The STA of claim 1, wherein:
the transceiver is further configured to transmit to, or receive from, the AP a TWT SP extension frame that includes:
an indication that an extension of the duration of the TWT SP is needed; and
an indication of the new SP end time, and
the processor is further configured to determine to extend the duration of the TWT SP to the new SP end time.

7. A non-AP multi-link device (MLD) comprising a plurality of STAs including the STA of claim 1, wherein:
the AP is one of a plurality of APs in an AP MLD,
the TWT schedule is a first TWT schedule having a first TWT SP with a first duration, and is established on a first of a plurality of links between the plurality of STAs and the plurality of APs,
a transceiver of a second of the plurality of STAs is configured to:
establish a second TWT schedule having a second TWT SP with the AP MLD on a second of the links; and
receive, from the AP MLD on the second link during the second TWT SP, a TWT SP extension frame that includes an indication to the non-AP MLD to extend the first duration of the first TWT SP, and
the processor is operably coupled to transceivers of the plurality of STAs, and is further configured to determine, based on the TWT SP extension frame received on the second link, to extend the first duration of the first TWT SP on the first link.

8. A wireless access point (AP) device, comprising:
a transceiver configured to:
establish a target wake time (TWT) schedule with a station (STA), the TWT schedule having a TWT service period (SP) with a duration that ends at a nominal SP end time, wherein the STA is configured to remain in an awake state for the duration of the TWT SP; and a processor operably coupled to the transceiver, the processor configured to determine to extend the duration of the TWT SP over a first link based on a transmission of a frame having extension information in a frame exchange over a second link to a new SP end time indicated in the extension information that is after the nominal SP end time to complete the transmission of the frame.

9. The AP of claim 8, wherein:

the transceiver is further configured to begin a downlink (DL) frame exchange with the STA during the TWT SP, and the processor is further configured to determine, based on the DL frame exchange not being completed at the nominal SP end time, to extend the duration of the TWT SP until the DL frame exchange is completed.

10. The AP of claim 8, wherein:

the processor is further configured to:

determine that a DL frame exchange with the STA during the TWT SP cannot be completed by the nominal TWT SP end time; and generate a TWT SP extension frame that includes an indication to the STA to extend the duration of the TWT SP, and the transceiver is further configured to:

begin the DL frame exchange with the STA during the TWT SP; and transmit, to the STA in the DL frame exchange, the TWT SP extension frame.

11. The AP of claim 8, wherein:

the transceiver is further configured to:

begin an uplink (UL) frame exchange with the STA during the TWT SP; and receive, from the STA in the UL frame exchange, a buffer status report (BSR) that indicates an amount of UL packets to be transmitted to the AP during the TWT SP, and the processor is further configured to determine, based on the BSR, to extend the duration of the TWT SP until the UL frame exchange is completed.

12. The AP of claim 8, wherein:

the transceiver is further configured to:

begin a UL frame exchange with the STA during the TWT SP; and receive, from the STA in the UL frame exchange, a TWT SP extension frame that includes an indication to the AP that an extension of the duration of the TWT SP is needed, and the processor is further configured to determine, based on the TWT SP extension frame, to extend the duration of the TWT SP until the UL frame exchange is completed.

13. The AP of claim 8, wherein:

the transceiver is further configured to transmit to, or receive from, the STA a TWT SP extension frame that includes:

an indication that an extension of the duration of the TWT SP is needed; and an indication of the new SP end time, and the processor is further configured to determine to extend the duration of the TWT SP to the new SP end time.

14. An AP multi-link device (MLD) comprising a plurality of APs including the AP of claim 8, wherein:

the STA is one of a plurality of STAs in a non-AP MLD, the TWT schedule is a first TWT schedule having a first TWT SP with a first duration, and is established on a first of a plurality of links between the plurality of APs and the plurality of STAs, a transceiver of a second of the plurality of APs is configured to establish a second TWT schedule having a second TWT SP with the non-AP MLD on a second of the links, the processor is operably coupled to transceivers of the plurality of APs, and is further configured to generate a TWT SP extension frame that includes an indication to the non-AP MLD to extend the first duration of the first TWT SP on the first link, and the transceiver of the second AP is further configured to transmit, to the non-AP MLD on the second link during the second TWT SP, the TWT SP extension frame.

15. A method of wireless communication performed by a wireless station (STA) device, the method comprising:

establishing a target wake time (TWT) schedule with an access point (AP), the TWT schedule having a TWT service period (SP) with a duration that ends at a nominal SP end time;

remaining in an awake state for the duration of the TWT SP; and determining to extend the duration of the TWT SP over a first link based on a transmission of a frame having extension information in a frame exchange over a second link to a new SP end time indicated in the extension information that is after the nominal SP end time to complete the transmission of the frame.

16. The method of claim 15, further comprising:

beginning a downlink (DL) frame exchange with the AP during the TWT SP; and determining, based on the DL frame exchange not being completed at the nominal SP end time, to extend the duration of the TWT SP until the DL frame exchange is completed.

17. The method of claim 15, further comprising:

beginning a DL frame exchange with the AP during the TWT SP;

receiving, from the AP in the DL frame exchange, a TWT SP extension frame that includes an indication to the STA to extend the duration of the TWT SP; and determining, based on the TWT SP extension frame, to extend the duration of the TWT SP until the DL frame exchange is completed.

18. The method of claim 15, further comprising:

determining that an uplink (UL) frame exchange with the AP during the TWT SP cannot be completed by the nominal TWT SP end time;

generating a buffer status report (BSR) that indicates an amount of UL packets to be transmitted to the AP during the TWT SP;

beginning the UL frame exchange with the AP during the TWT SP; and transmitting, to the AP in the UL frame exchange, the BSR.

19. The method of claim 15, further comprising:

determining that a UL frame exchange with the AP during the TWT SP cannot be completed by the nominal TWT SP end time;

generating a TWT SP extension frame that includes an indication to the AP that an extension of the duration of the TWT SP is needed;

beginning the UL frame exchange with the AP during the TWT SP; and transmitting, to the AP in the UL frame exchange, the TWT SP extension frame.

20. The method of claim 15, further comprising:

transmitting to, or receiving from, the AP a TWT SP extension frame that includes:

an indication that an extension of the duration of the TWT SP is needed, and an indication of the new SP end time; and determining to extend the duration of the TWT SP to the new SP end time.

* * * * *